United States Patent [19]
Fukushima

[11] Patent Number: 5,992,300
[45] Date of Patent: Nov. 30, 1999

[54] BEVERAGE EXTRACTION APPARATUS

[75] Inventor: Naoto Fukushima, Gunma-Ken, Japan

[73] Assignee: Sanyo Electric Co., Ltd., Osaka-Fu, Japan

[21] Appl. No.: 09/212,504

[22] Filed: Dec. 15, 1998

[51] Int. Cl.[6] .................................................. A47J 31/32
[52] U.S. Cl. ........................ 99/302 R; 99/279; 99/289 T; 99/286
[58] Field of Search .......................... 99/279, 286, 289 R, 99/302 R, 289 T, 281, 280; 426/433

[56] References Cited

U.S. PATENT DOCUMENTS

| | | | |
|---|---|---|---|
| Re. 31,352 | 8/1983 | Kueser et al. | 99/283 |
| 5,127,317 | 7/1992 | Takayanagi et al. | 99/302 R |

*Primary Examiner*—Reginald L. Alexander
*Attorney, Agent, or Firm*—Scully, Scott, Murphy & Presser

[57] ABSTRACT

The invention is aimed at provision of a beverage extraction apparatus in which the cylinder for extraction is kept clean and, thus, the quality of the extracted beverage is maintained without periodical or frequent maintenance for cleanness. A portion of cleaning liquid overflowing from the upper chamber (mixing chamber) is drained by using a draining trough and a pipe. A valve is interposed between the upper chamber and the extraction chamber. When the valve is closed, the cleaning liquid supplied to the upper chamber in excessive amount overflows from the chamber and drained. When the valve is opened, the cleaning liquid flows from the upper chamber into the extraction chamber. Thereby, both chambers are cleaned efficiently.

7 Claims, 23 Drawing Sheets

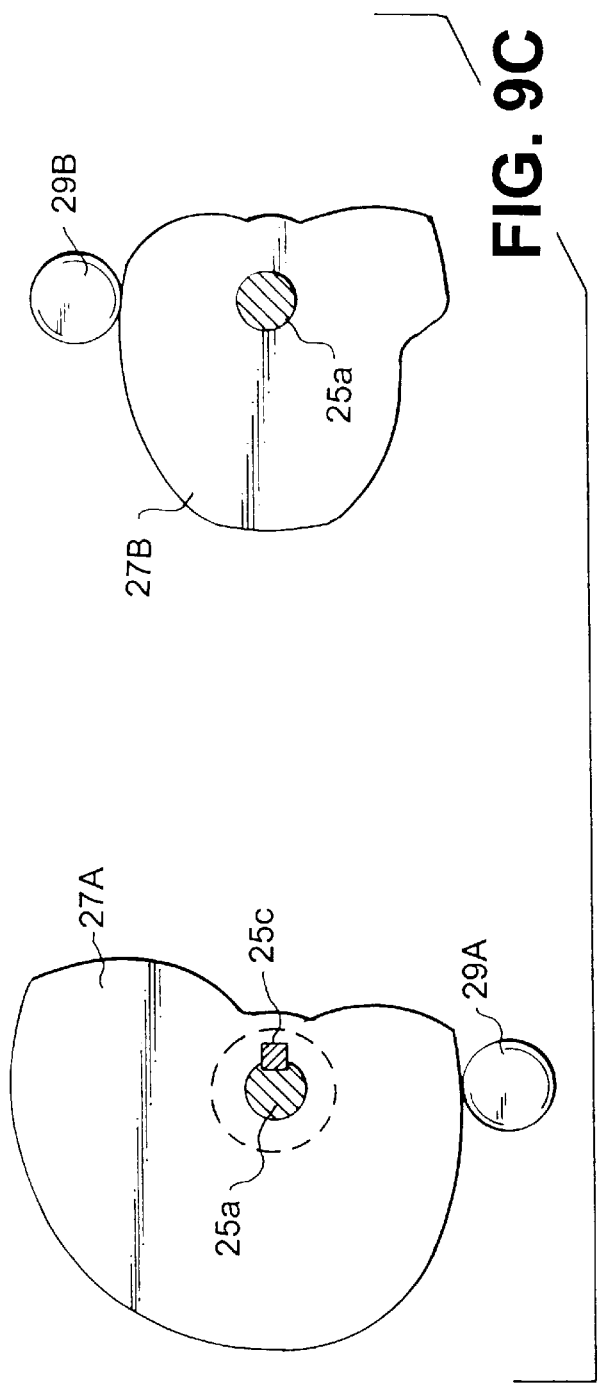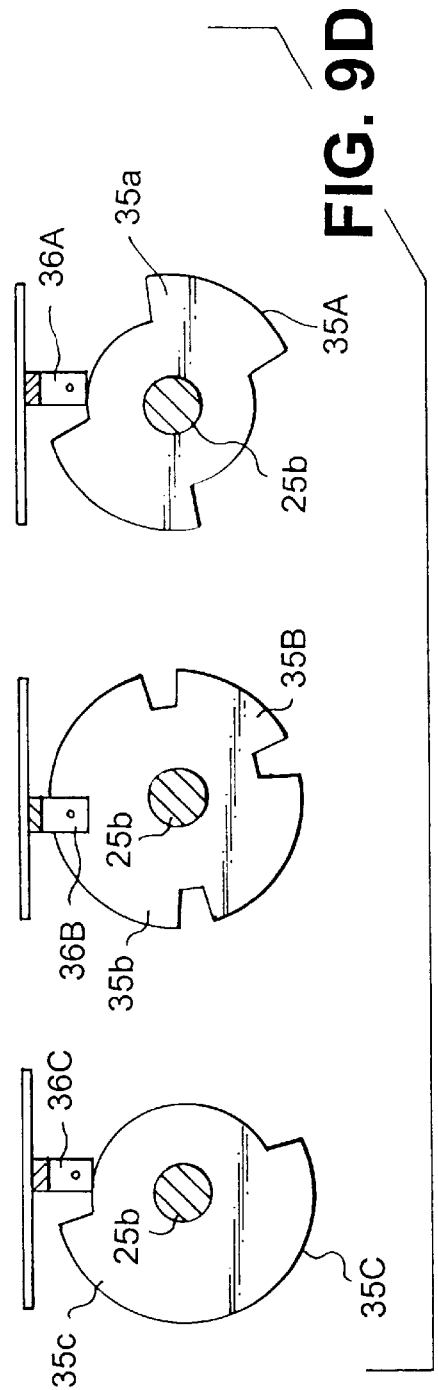

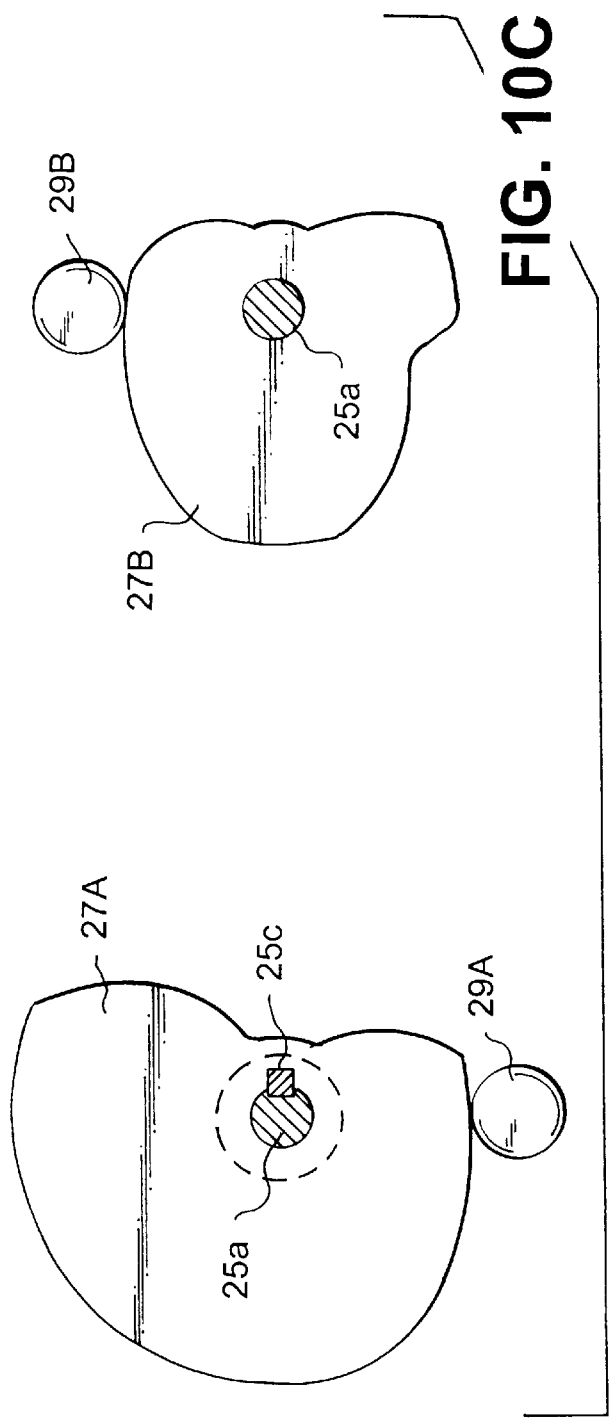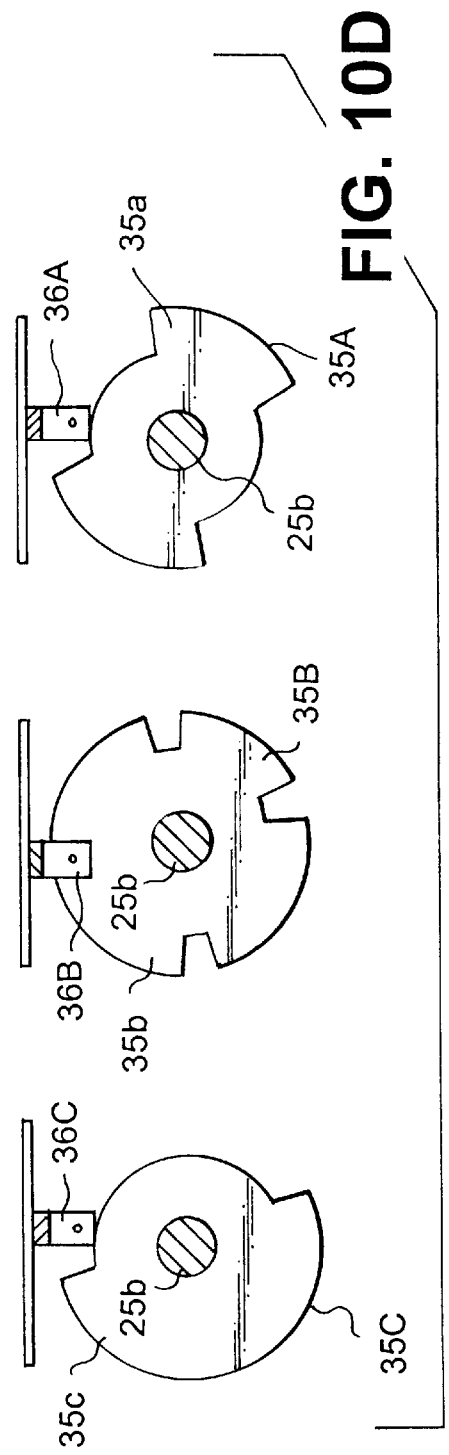

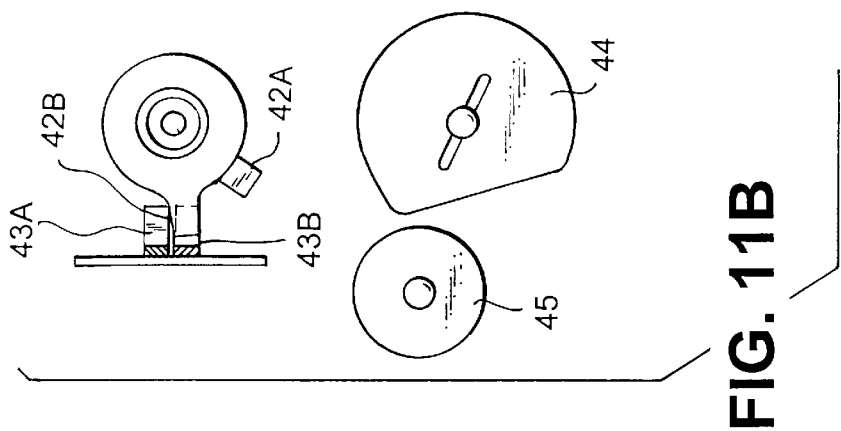
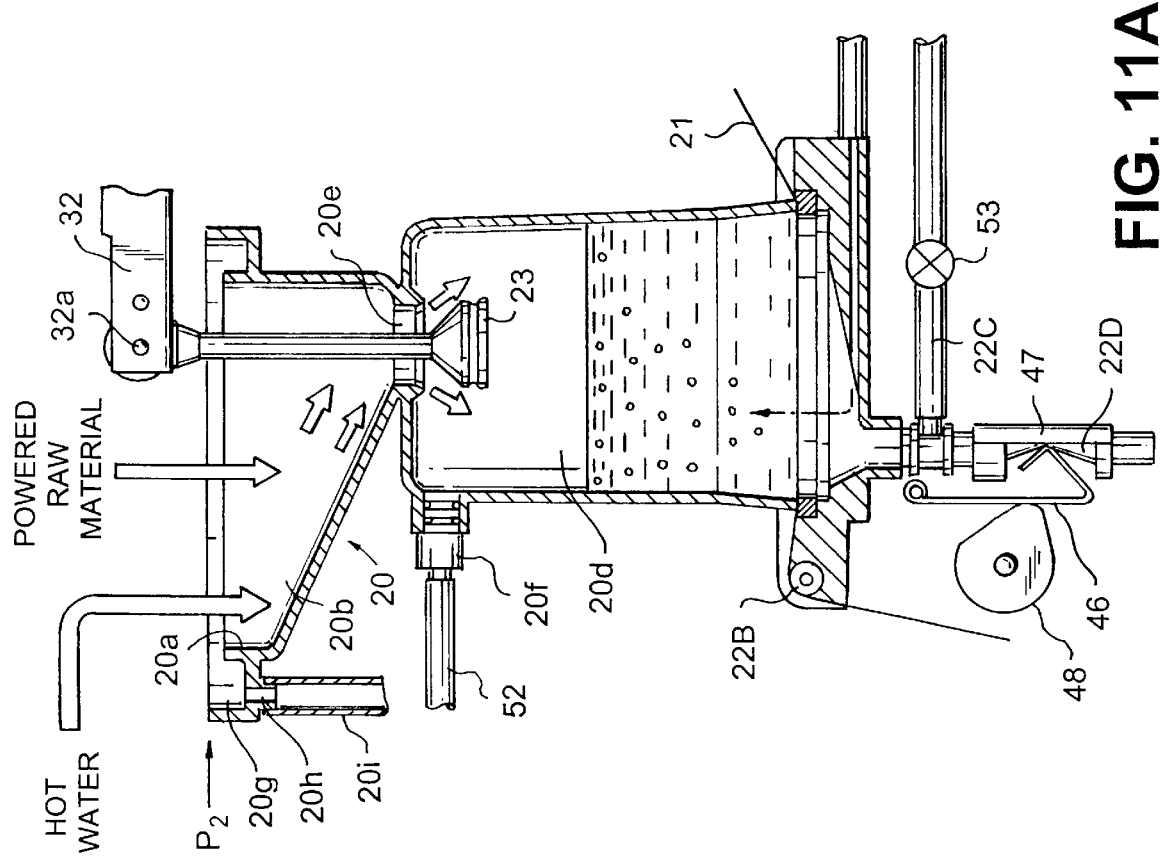
FIG. 11B
FIG. 11A

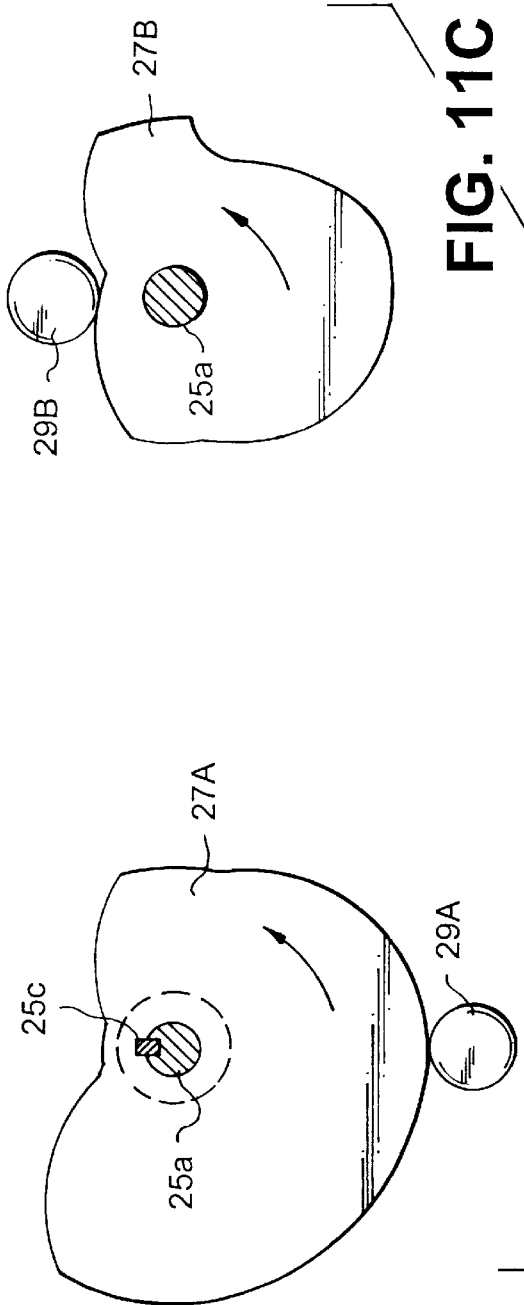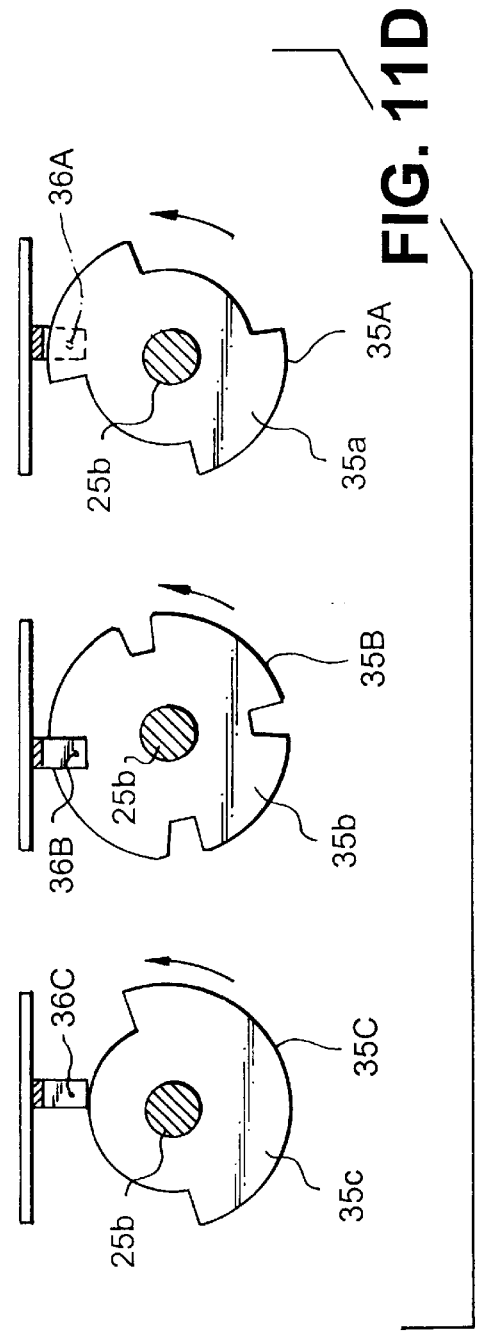

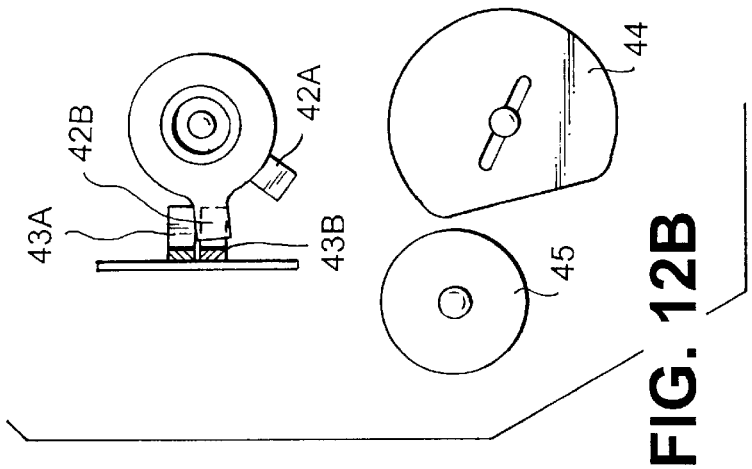
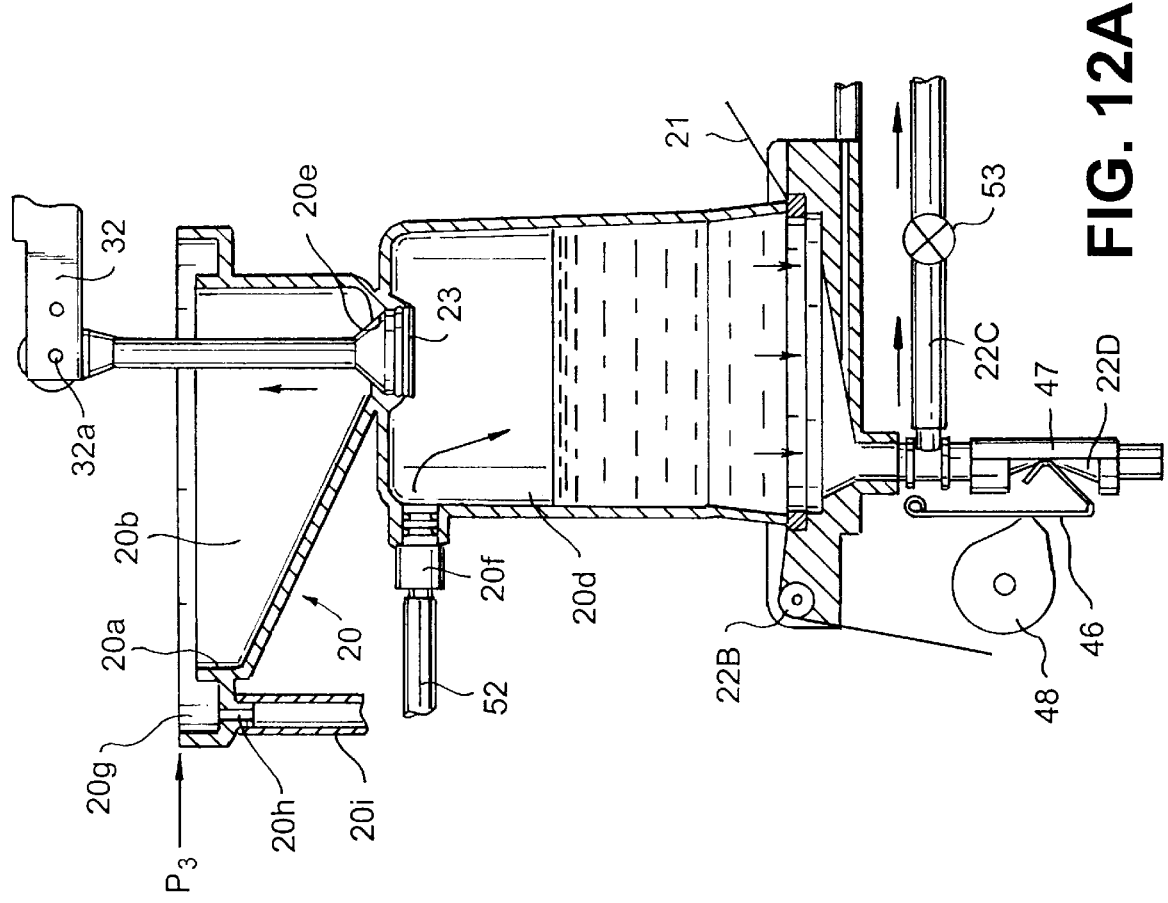
FIG. 12B
FIG. 12A

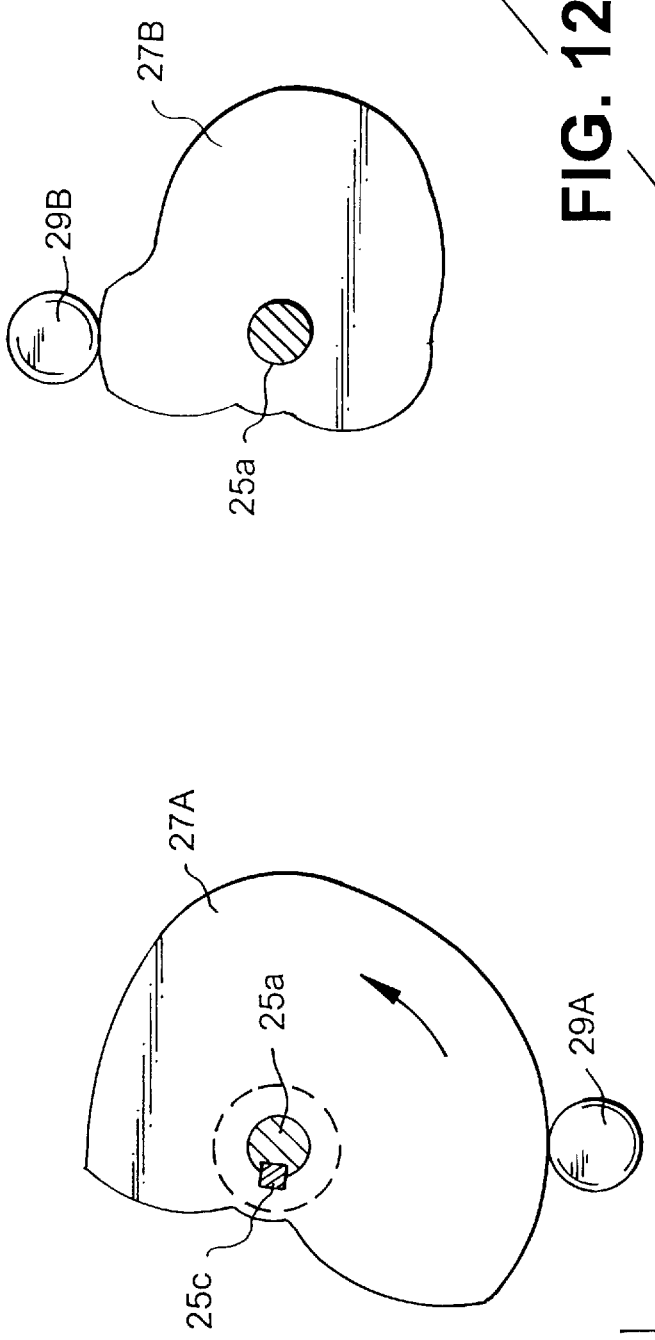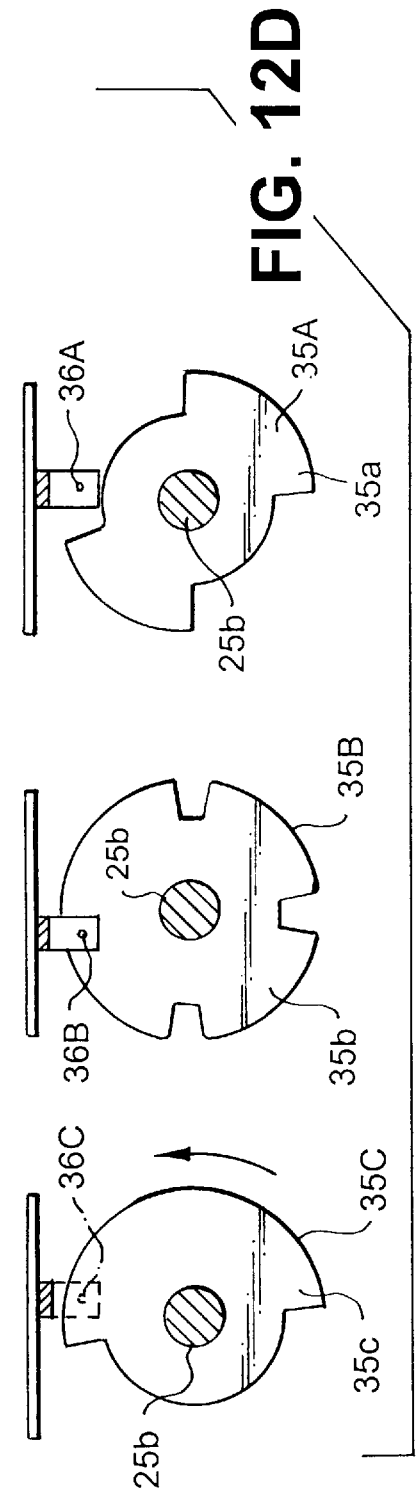

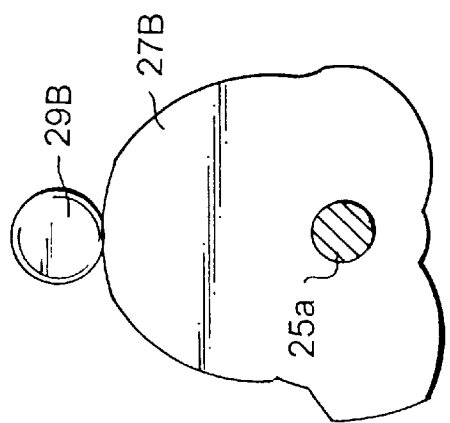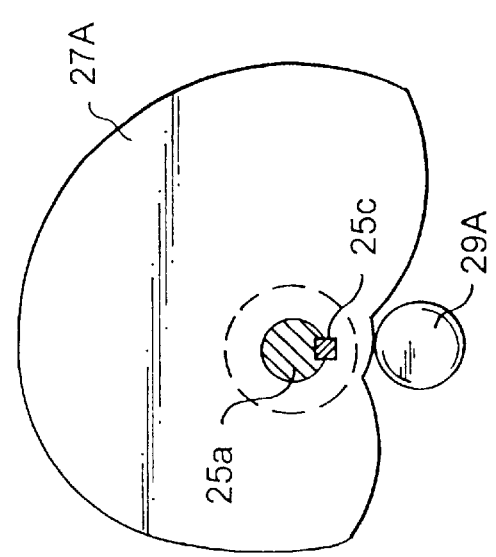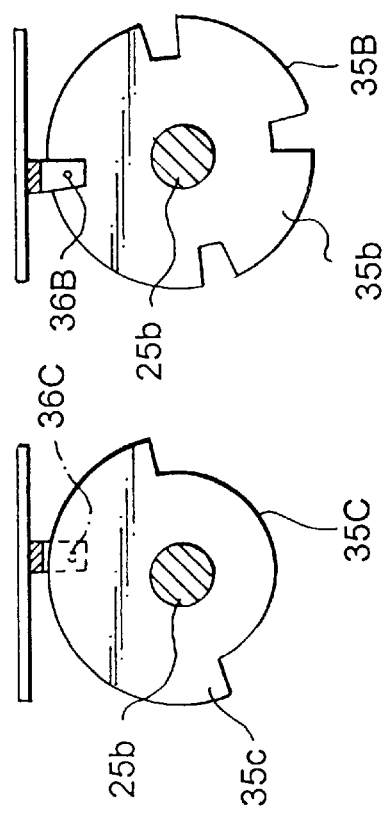
FIG. 13C
FIG. 13D

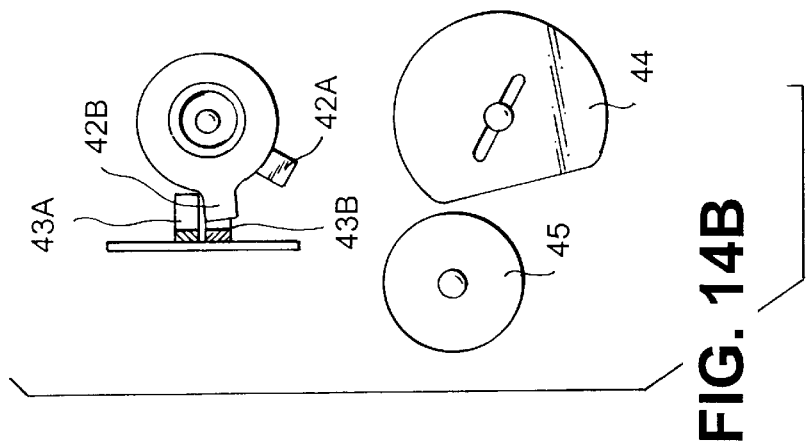
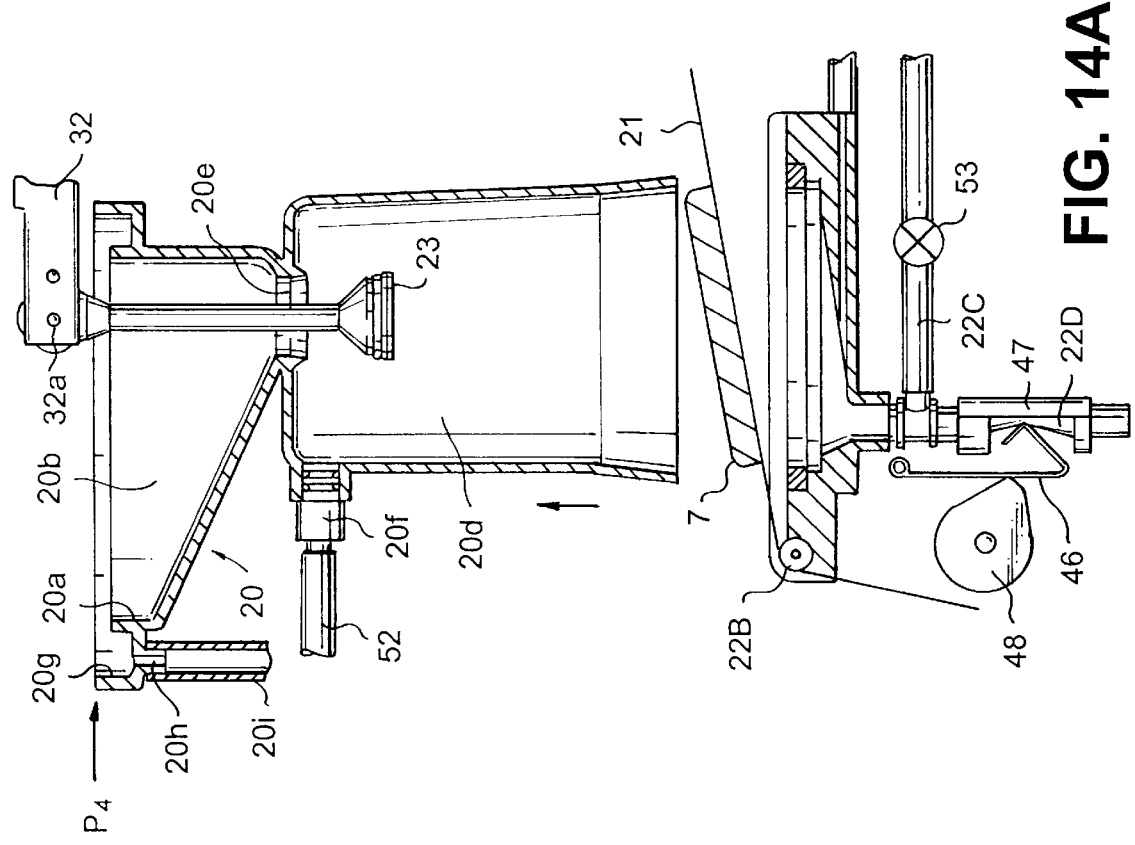

5,992,300

BEVERAGE EXTRACTION APPARATUS

FIELD OF THE INVENTION

This invention relates to a beverage extraction apparatus, and more particularly to a beverage extraction apparatus adapted to a cup type beverage vendor for serving cups of beverage such as coffee, black tea, woolong tea, and green tea extracted from the raw materials.

BACKGROUND OF THE INVENTION

A typical conventional beverage extraction apparatus is shown in FIG. 1. This beverage extraction apparatus is provided with cylinder 20 for stirring a mixture of a raw material in the form of powder and hot water, paper filter 21 for filtration of the mixture discharged from cylinder 20 and beverage receiver 22 for receiving the beverage through paper filter 21. Cylinder 20 is supported by a guide rail not shown, to be movable up and down. Paper filter 21 is arranged under cylinder 20 so that the mixture prepared in and discharged from cylinder 20 is supplied to paper filter 21, in which the extract of the raw material is separated from the mixture.

Cylinder 20 consists of mixing chamber 20b for mixing the powdered raw material and hot water supplied from inlet 20a provided upward and discharging the mixture from conduit 20e provided at the bottom, extraction chamber 20d for producing the beverage by extraction process connected with mixing chamber 20b by conduit 20e.

Conduit 20e is allowed to open or close by means of valve 23 connected rotatably by pin 32a to the distal end of lever 32. Extraction chamber 20d has inlet 20f for introducing pressurized air thereto through air pipe 52 from an air pump not shown.

Paper filter 21 is supplied in the form of a roll and the used portion is transferred to the left in FIG. 1.

Beverage receiver 22 is provided with inlet 22a for receiving the beverage extracted by paper filter 21, beverage transporting tube 22C for supplying the beverage received by inlet 22a to a cup, and drain tube 22D for draining the beverage received by inlet 22a. Beverage transporting tube 22C is provided with beverage supply valve 53 operated electromagnetically. Pressurized air is supplied to inlet 22a through air pipe 52 from an air pump not shown during agitation process and cleaning process. Drain tube 22D is closed by the action of pressure plate 46 which is pressed by rotating cam 48 so as to pinch drain tube 22D between pressure plate 46 and stationary plate 47.

The beverage extraction apparatus operates on demand for the beverage. At first, rotating cam 48 is rotated, so that pressure plate 46 is pressed by a projection of rotating cam 48, thereby drain tube 22D is pinched between pressure plate 46 and stationary plate 47 to be closed. Next, cylinder 20 and valve 23 are descended from the stand-by position shown so that the lower end of cylinder 20 comes into contact with beverage receiver 22, and conduit 20e is opened. Thereafter, the powdered raw material and hot water are supplied from inlet 20a, and beverage supply valve 53 is closed in accordance with the supply. At the same time, pressurized air is supplied to beverage receiver 22 from the air pump through air pipe 52. The pressurized air flows into extraction chamber 20d through paper filter 21, whereby the air bubbles agitate the mixture of powdered raw material and water in extraction chamber 20d, accelerating the dissolution of beverage components into the hot water.

After agitation for a predetermined period, valve 23 is elevated to close conduit 20c, and pressurized air is supplied from the air pump through air pipe 52 to inlet 20f at the top of extraction chamber 20d. The mixture in extraction chamber 20d is transported downward by pressure of the air supplied, filtered with paper filter 21 and supplied to the serving cup as the beverage through beverage receiver 22 and beverage supply tube 22C. After extraction for a predetermined period, cylinder 20 and valve 23 are elevated, paper filter 21 is advanced, the residue left on paper filter 21 is discarded together with paper filter 21, and a new portion of paper filter 21 is set over beverage receiver 22.

Meanwhile, cylinder 20 in the beverage extraction apparatus is cleaned in the time when frequency of serving is very small, such as night. A typical operation of the cleaning is as follows. At first, rotating cam 48 is rotated, so that pressure plate 46 is pressed by a protrusion of rotating cam 48, thereby drain tube 22D is pinched between pressure plate 46 and stationary plate 47 to be closed. Next, cylinder 20 and valve 23 are descended from the stand-by position shown so that the lower end of cylinder 20 comes into contact with beverage receiver 22, and conduit 20e is opened. Then, the powdered raw material and hot water are supplied from inlet 20a, and beverage supply valve 53 is closed in accordance with the supply. At the same time, pressurized air is supplied to beverage receiver 22 from an air pump through air pipe 52. The air flows into extraction chamber 20d so as to agitate the hot water in extraction chamber 20d, thereby the inside of extraction chamber 20d is cleaned.

FIG. 2 shows extraction chamber 20d in the state of cleaning. The air supplied to beverage receiver 22 flows through air filter 21 into extraction chamber 20d (as shown by an arrow) to form air bubbles, by which the hot water in extraction chamber 20d is agitated whereby the residue left inside extraction chamber 20d is removed.

After the cleaning by agitation for a predetermined period is finished, rotating cam 48 is rotated again so as to release pressure plate 46 from the pressure by a protrusion of rotating cam 48, thereby drain tube 22D is opened. Valve 23 is elevated to close conduit 20e, and pressurized air is supplied from the air pump through air pipe 52 to inlet 20f. The water used for the cleaning in extraction chamber 20d is transported downward by the pressure of air, passes through paper filter 21, and is discarded through beverage receiver 22 and drain tube 22D. After a predetermined period, cylinder 20 is elevated, paper filter 21 is advanced, the residue left on paper filter 21 is discarded together with paper filter 21, and a new portion of paper filter 21 is set over beverage receiver 22.

Cleaning in the conventional beverage extraction apparatus, however, is only applied to the extraction chamber. Thus, the raw material left inside the mixing chamber is not removed in the cleaning, resulting in imparting the cleanness of the mixing chamber. The maintenance of the beverage extraction apparatus is mandatory to keep the apparatus always clean, because the quality of the beverage to be served is deteriorated if the cleanness of the mixing chamber is lowered.

SUMMARY OF THE INVENTION

Accordingly, an object of the invention is to provide a beverage extraction apparatus capable of keeping good quality of the beverage to be served without periodical maintenance to keep the apparatus clean.

According to the first feature of the invention, a beverage extraction apparatus comprises:

an extraction chamber for beverage extraction;

an upper chamber provided above the extraction chamber in liquid communication therewith;

means for supplying cleaning liquid to the upper chamber;

means for discharging the cleaning liquid out of the upper chamber after cleaning by the cleaning liquid is finished; and means for draining a portion of the cleaning liquid overflowing from the upper chamber while the cleaning liquid is supplied to the upper chamber, the draining means being provided on the upper chamber.

It is preferred that the draining means comprises a trough provided around an upper opening of the upper chamber and a drain tube connected with the trough for draining the overflowing portion of the cleaning liquid.

According to the second feature of the invention, a beverage extraction apparatus comprises:

an extraction chamber for beverage extraction;

an upper chamber provided above the extraction chamber in liquid communication therewith;

means for providing the liquid communication;

means for supplying cleaning liquid to the upper chamber; and means for draining a portion of the cleaning liquid overflowing from the upper chamber during the cleaning using the cleaning liquid, the draining means being provided on the upper chamber, wherein:

the cleaning liquid to the upper chamber is transferred to the extraction chamber by way of the liquid communication providing means.

According to the third feature of the invention, a beverage extraction apparatus comprises:

an extraction chamber for beverage extraction;

an upper chamber provided above the extraction chamber in liquid communication therewith;

means for providing the liquid communication;

means for supplying cleaning liquid to the upper chamber; and means for draining a portion of the cleaning liquid overflowing from the upper chamber while the cleaning liquid is supplied to the upper chamber, the draining means being provided on the upper chamber, wherein:

the liquid communication providing means is opened and closed; and the cleaning liquid is contained in the upper chamber with the liquid communication providing means being closed.

It is preferred that the cleaning liquid is supplied from the upper chamber to the extraction chamber with the liquid communication providing means being opened.

The liquid communication providing means preferably comprises a valve which is opened and closed.

Alternatively, it is preferable that the cleaning liquid is supplied to the upper chamber with the liquid communication providing means (e.g. a valve) being closed, after the cleaning liquid has been supplied to the upper chamber for cleaning thereof with the liquid communication providing means being opened. Thereby, the upper chamber and the extraction chamber are washed simultaneously after the upper chamber is filled with the cleaning liquid.

BRIEF DESCRIPTION OF THE DRAWINGS

The invention will be described in more detail in conjunction with the accompanying drawings wherein:

FIG. 9A to FIG. 9D are explanatory views of the beverage extraction apparatus in the embodiment in the stand-by status;

FIG. 10A to FIG. 10D are explanatory views of the state of drain tube in the beverage extraction apparatus in the embodiment;

FIG. 11A to FIG. 11D are explanatory views of the beverage extraction apparatus in the embodiment in the agitation process;

FIG. 12A to FIG. 12D are explanatory views of the beverage extraction apparatus in the embodiment in the extraction process;

FIG. 13A to FIG. 13D are explanatory views of the beverage extraction apparatus in the embodiment in the extraction process;

FIG. 14A to FIG. 14D are explanatory views of the beverage extraction apparatus in the embodiment in the final state of extraction process;

PREFERRED EMBODIMENTS OF THE INVENTION

Preferred embodiments of the invention will be explained in detail with reference to the attached drawings.

Figure 3:
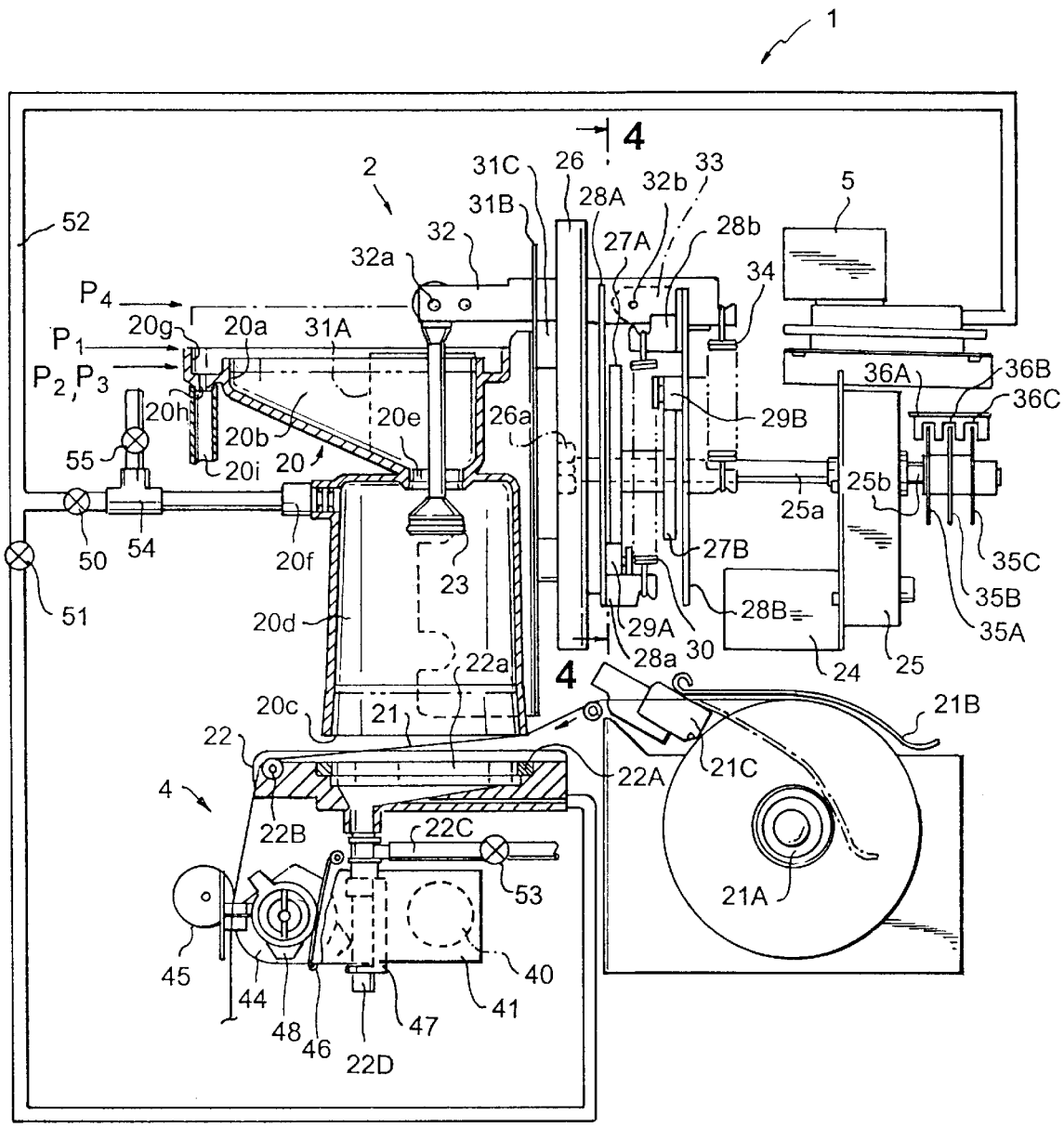
FIG. 3 is an explanatory view of a beverage extraction apparatus in the first preferred embodiment of the invention.

FIG. 3 shows the first preferred embodiment of beverage extraction apparatus according to the invention. In FIG. 3, beverage extraction apparatus 1 consists of extraction unit 2 for extracting the beverage from powdered raw material, such as coffee powder, with hot water, waste processing unit 4 for processing the extraction residue and other wastes to be discarded, and air pump 5 for supplying pressurized air to portions of beverage extraction apparatus 1.

Extraction unit 2 is provided with cylinder 20 for stirring a mixture of powdered raw material and hot water, paper filter 21 for filtration of the mixture discharged from cylinder 20 and beverage receiver 22 for receiving the beverage through paper filter 21. Extraction unit 2 is supported by a guide rail not shown, to be movable up and down. Paper filter 21 is arranged under cylinder 20 so that the mixture prepared in and discharged from cylinder 20 is supplied to paper filter 21, in which the beverage extracted from the raw material is separated.

Cylinder 20 consists of mixing chamber 20b for mixing the powdered raw material and hotwater supplied from inlet 20a provided upward and discharging the mixture from conduit 20e provided at the bottom and extraction chamber 20d for producing the beverage by extraction process being connected with mixing chamber 20b by conduit 20e.

Conduit 20e is allowed to open or close by means of valve 23 which is movable up and down. Valve 23 is engaged to the distal end of lever 32 by pin 32a rotatably around the latter. Extraction chamber 20d has inlet 20f for introducing pressurized air thereto through air pipe 52 from air pump 5.

Mixing chamber 20b is provided with trough 20g formed around the inlet 20a, drain 20h formed at the predetermined position at the bottom of trough 20g, and drain tube 20i which is introduced into a waste vessel (not shown) at the distal end.

Paper filter 21 in the form of a roll is set on axis 21A to be rotatable around it. Paper filter 21 unwound from the roll is drawn to the left in FIG. 3 by means of waste processing motor 40 in waste processing unit 4. Remaining amount of paper filter 21 is detected by filter detecting lever 21B and filter emptiness detecting sensor 21C, such as a microswitch, for outputting a signal indicating the emptiness of paper filter 21. Filter amount detecting lever 21B is supported rotatably at the proximal end and touches always with the outer surface of the roll of paper filter 21 at the distal end or in the middle portion. Filter amount detecting lever 21B comes into contact with filter emptiness detecting sensor 21C when the lever is rotated to the position corresponding to the emptiness of paper filter 21. Filter emptiness detecting sensor 21C outputs a signal indicating the emptiness of paper filter 21 when filter amount detecting lever 21B is rotated to the position corresponding to the emptiness.

Beverage receiver 22 is provided with opening 22a in the upper part, roller 22B for guiding the paper filter 21 on the side, and beverage supply tube 22c and drain pipe 22D in the lower part. Opening 22a is provided with rubber seal 22A on the periphery in order to prevent leaking of the mixture when cylinder 20 (outlet 20c) comes into contact with the periphery of opening 22a. Beverage supply tube 22c is provided with beverage supply valve 53 operated electromagnetically. Drain pipe 22D serves for discharging the beverage.

Extraction unit 2 is provided with extraction motor 24, reducing unit 25 having output axes 25a and 25b on both sides, supporting plate 26 for supporting axis 25a, cylinder cam 27A, valve cam 27B, cylinder driving plate 28A, valve driving plate 28B, cylinder cam follower 29A, valve cam follower 29B, drawing coil spring 30, engaging members 28a, 28b and 28c, connecting members 31A, 31B and 31C, lever 32, connecting member 33, and drawing coil spring 34. Reduction unit 25 serves to reduce rotation rate of extraction motor 24 to a predetermined rate at which axes 25a and 25b are rotated. An end of output axis 25a is supported by bearing 26a on supporting plate 26. Cylinder cam 27A and valve cam 27B are fixed to output axis 25a. Cylinder driving plate 28A and valve driving plate 28B serve to drive cylinder 20 and valve 23, respectively. Cylinder cam follower 29A and valve cam follower 29B are mounted on cylinder driving plate 28A and valve driving plate 28B, respectively. Engaging members 28a and 28b are mounted on cylinder driving plate 28A and valve driving plate 28B, respectively. Drawing coil spring 30 is engaged at its both ends with engaging members 28a and 28b mounted on cylinder driving plate 28A and valve driving plate 28B, respectively, thus serves to draw cylinder driving plate 28A and valve driving plate 28B engaged respectively with engaging members 28a and 28b close to each other, so that cylinder cam follower 29A and valve cam follower 29B are brought into contact with cylinder cam 27A and valve cam 27B, respectively. Connecting members 31A, 31B and 31C respectively connect cylinder 20 with cylinder driving plate 28A. Lever 32 is connected with valve 23 rotatably by pin 32a in the distal portion. Fixing member 28c is mounted on valve driving plate 28B. Drawing coil spring 34 is engaged at both ends to the proximal portion of lever 32 and fixing member 28c, respectively. Extraction unit 2 is so constructed to complete a series of processes including agitation process, extraction process and waste disposal process in accordance with a rotation respectively of output axes 25a, 25b and 41a.

On the side having output axis 25b of reducing unit 25, a process inspection system is provided for inspecting the progress of respective processes. In more detail, output axis 25b of reducing unit 25 is provided with the first, second and third process inspection plates, 35A, 35B and 35C, around which the first, second and third process inspection sensors, 36A, 36B and 36C, such as photo sensors, are provided in order to detect angular positions of the first, second and third process inspection plates, 35A, 35B and 35C.

Air pump 5 is connected with air pipe 52 which leads to inlet 20f of extraction chamber 20d and beverage receiver 22. Air pipe 52 is provided with upper air valve 50 and T-shaped branch 54 to which air discharge valve 55 is attached, preceeding inlet 20f of extraction chamber 20d. Lower air valve 51 operated electromagnetically is provided on airpipe 52, too, in the vicinity of beverage receiver 22.

Figure 1:
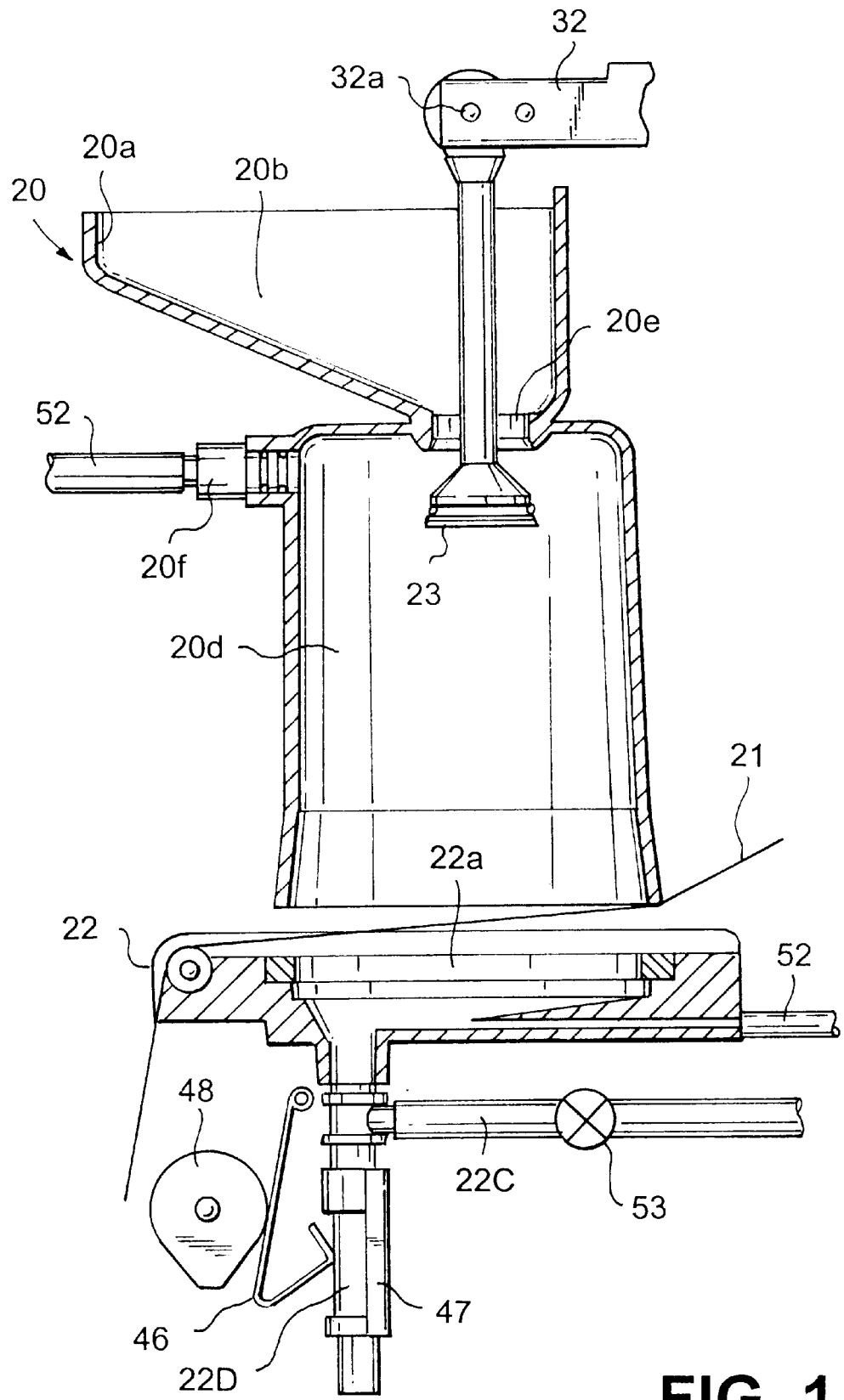
FIG. 1 is an explanatory view of a conventional beverage extraction apparatus.
Figure 2:
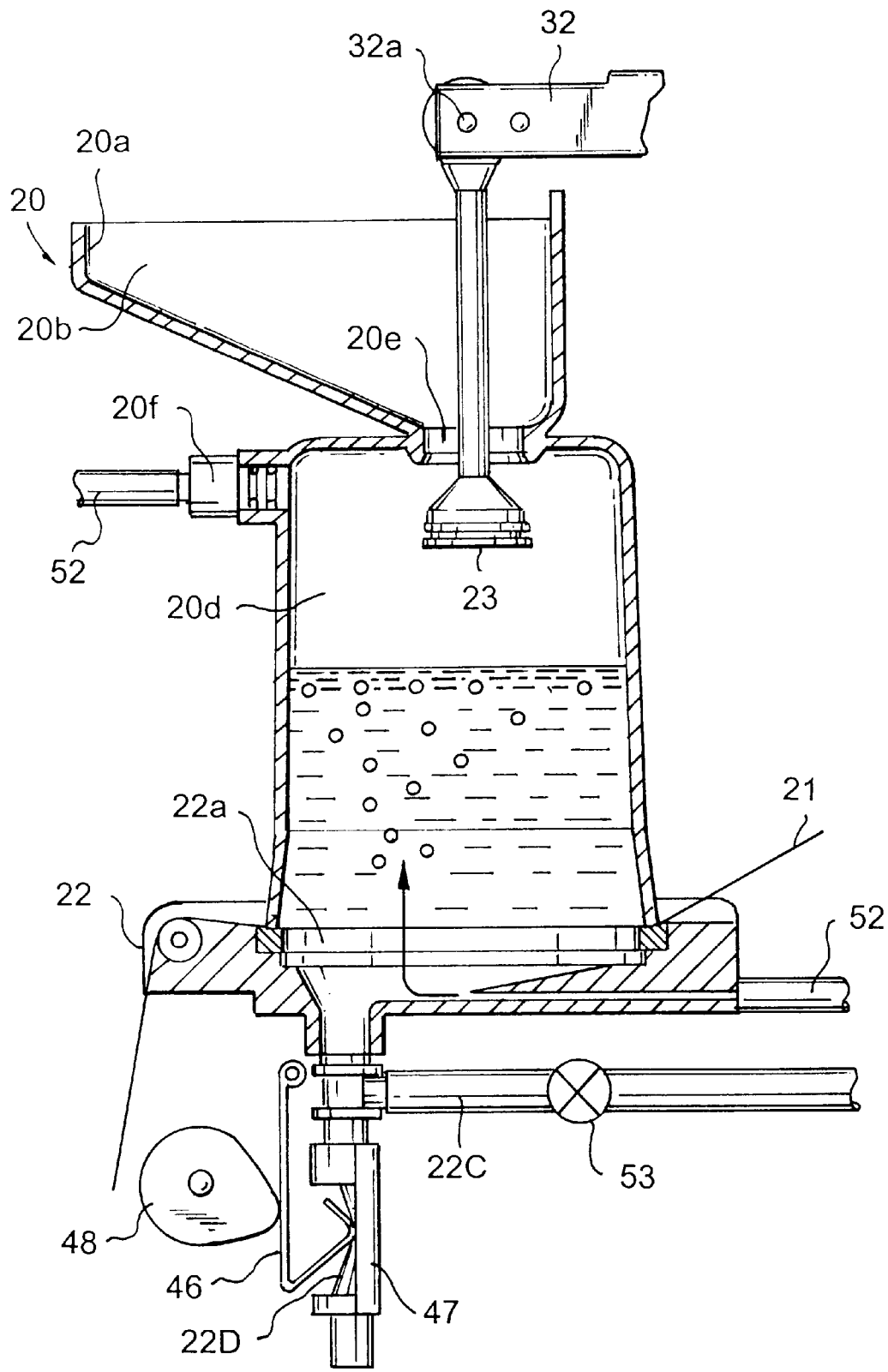
FIG. 2 is an explanatory view of a conventional beverage extraction apparatus in the state of cleaning.
Figure 4:
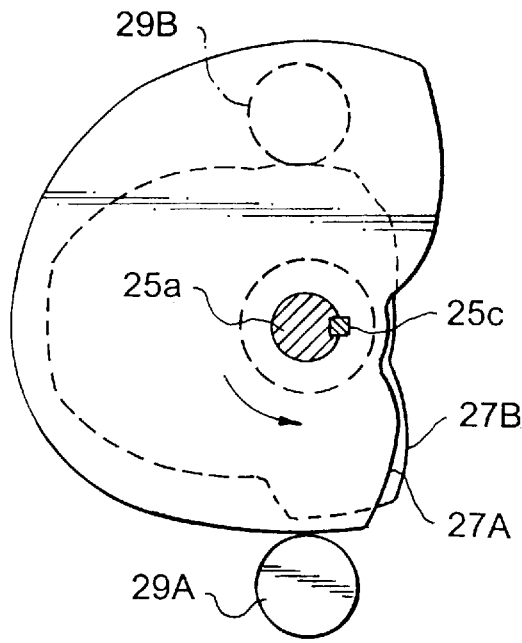
FIG. 4 is a cross-sectional view of the beverage extraction apparatus shown in FIG. 1.

FIG. 4 is a cross-sectional view of the apparatus shown in FIG. 1, along the plane indicated by line A—A. Cylinder cam 27A and valve cam 27B are fixed to output axis 25a of reducing unit 25 by way of key 25c. Their cam surfaces have the shapes as shown in FIG. 4.

Figure 5:
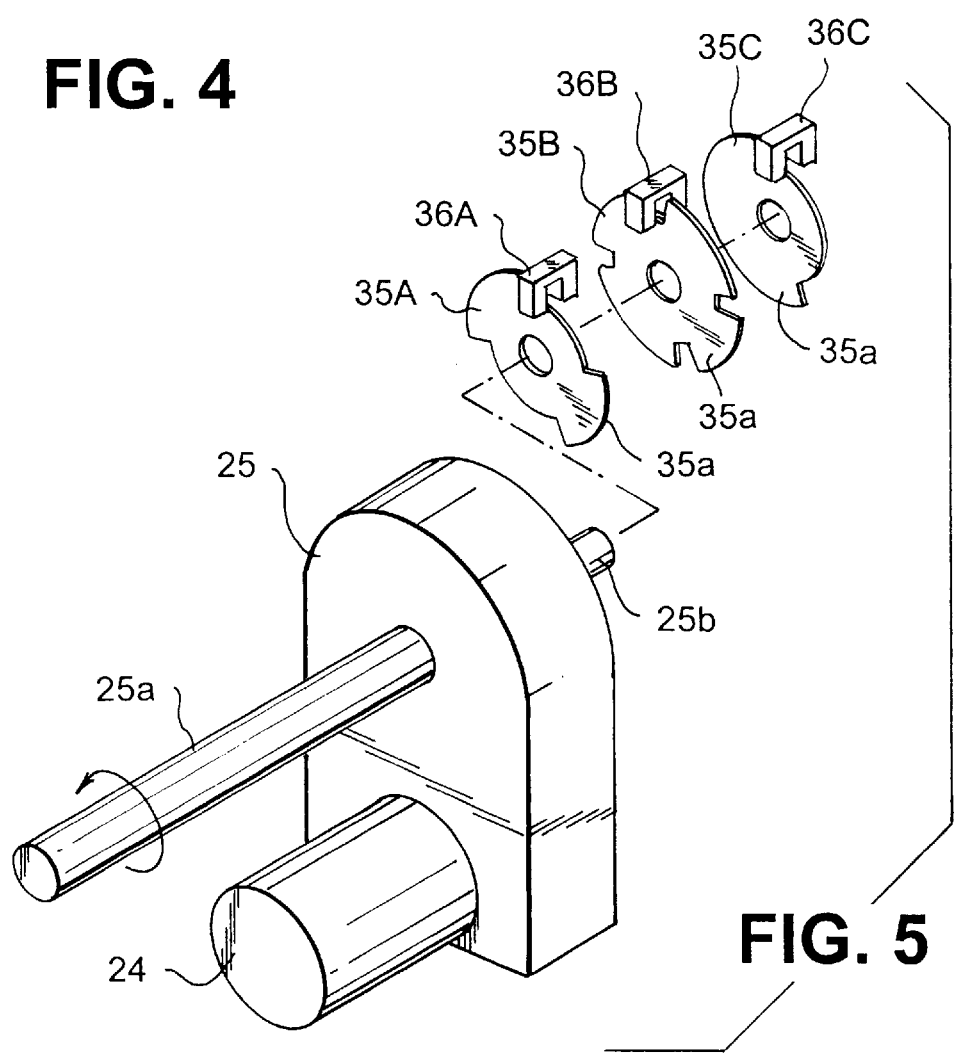
FIG. 5 is a perspective view of the process inspection system in the embodiment of the invention.

FIG. 5 is a perspective view of the process inspection system. Protrusions 35a are formed at two positions on first process inspection plate 35A, encompassing 90 degrees. Protrusions 35b are formed at four positions on second process inspection plate 35b, encompassing 70 degrees. Protrusions 35c are formed at one position on third process inspection plate 35c, encompassing 180 degrees.

Figure 6:
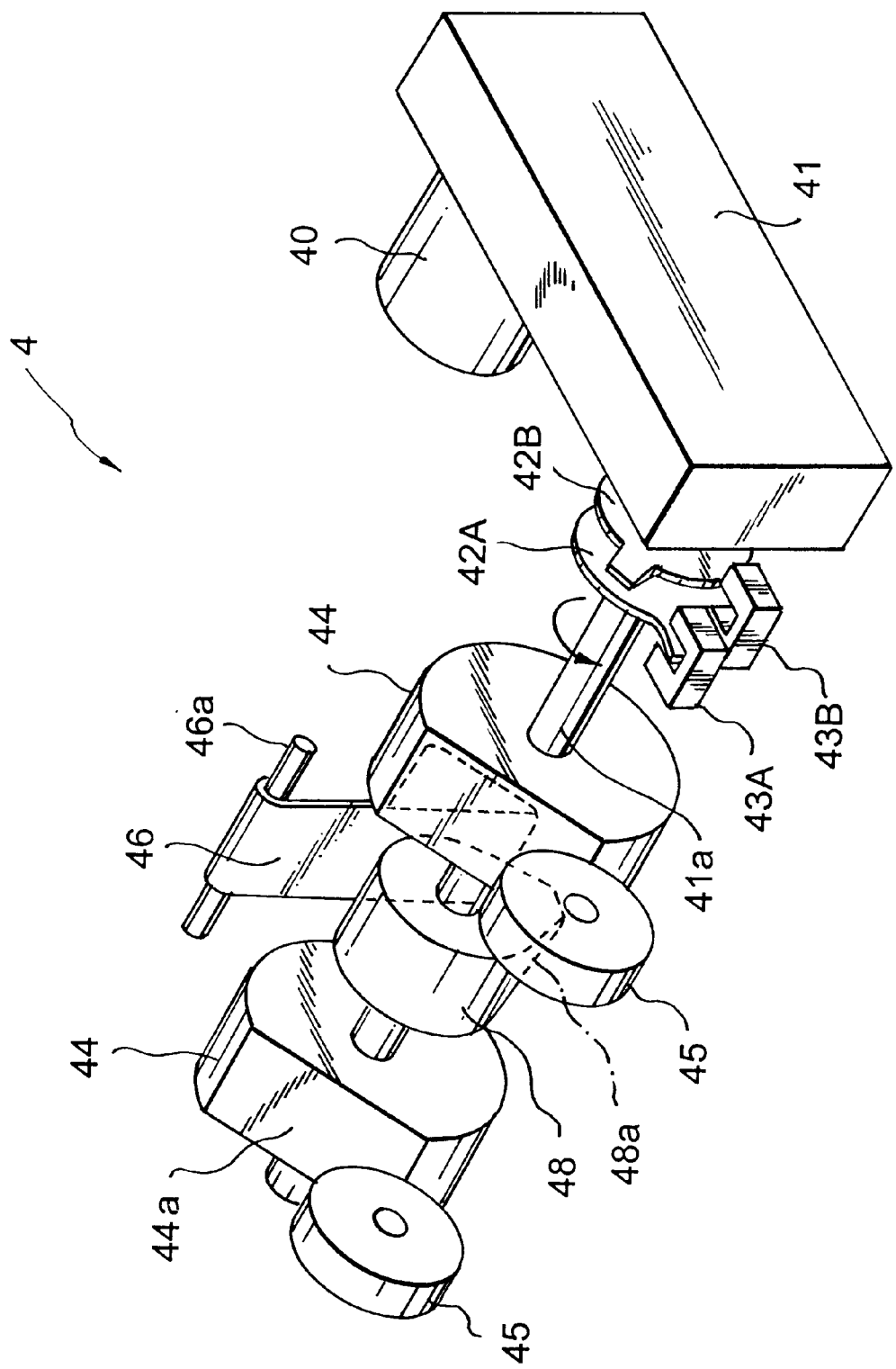
FIG. 6 is a brief perspective view of the waste processing portion of the beverage extraction apparatus in the preferred embodiment.

FIG. 6 is a brief perspective view of waste processing unit 4. Waste processing unit 4 is provided with waste processing motor 40, reducing unit for reducing the rotation rate of waste processing motor 40 to a predetermined rate of rotation, drain tube opening detection plate 42A and drain tube closing detection plate 42B fixed to output axis 41a of reducing unit 41, drain tube opening detector 43A, drain tube closing detector 43B, a pair of filter supply rollers 44, a pair of guide rollers 45 for pressing paper filter 21 toward filter supply rollers 44, pressure plate 46 for closing drain tube 22D, and pressing cam 48 for causing pressure plate 46 to rotate. Drain tube opening detector 43A is a detector such as photo sensor which outputs an off signal indicating the opened state (stand-by state) of drain tube 22D in response to blocking of light (such as shutting off) by protrusion 42a of drain tube opening detection plate 42A. Drain tube closing detector 43B is a detector such as photo sensor which outputs an off-signal indicating the closed state of drain tube 22D in response to blocking of light (such as shutting off) by protrusion 42a of drain tube closing detection plate 42B. Filter supply rollers 44 are a pair of rollers, fixed to output axis 41a, each having indentation 44a on the periphery and serve to unwind a roll of paper filter 21 to supply a predetermined length of paper filter 21. Guide rollers 45 serve to press paper filter 21 toward filter supply rollers 44 by means of a spring not shown. Pressing cam 48 is fixed to output axis 41a and has indentation 44a on the periphery, which serves to cause pressure plate 46 to rotate.

Figure 7:
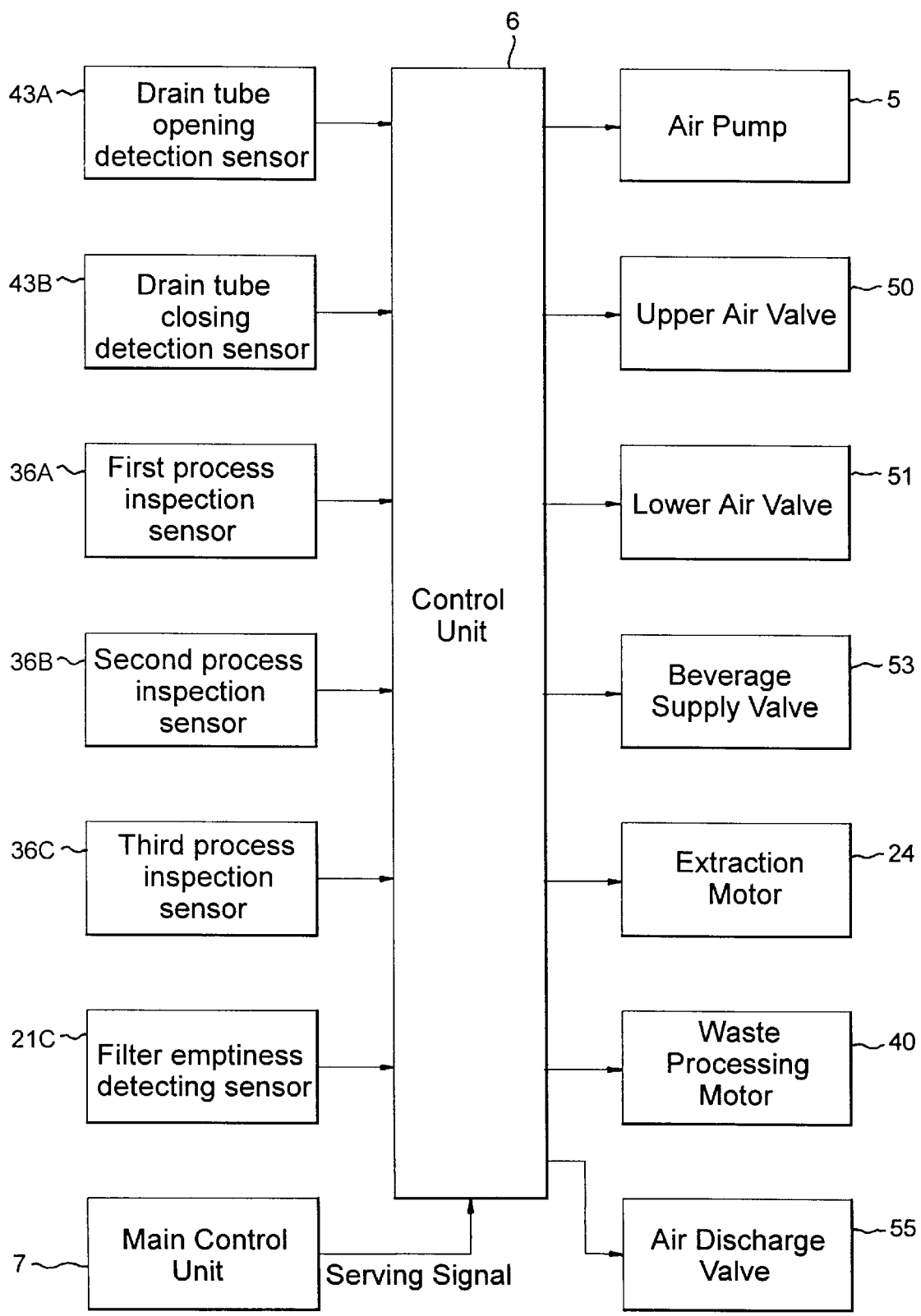
FIG. 7 is a block diagram of the control system in the beverage extraction apparatus in the preferred embodiment.

FIG. 7 shows the control system of beverage extraction apparatus in the preferred embodiment. Beverage extraction apparatus 1 includes control system 6 for controlling every part of the apparatus. With control system 6, there are connected drain tube opening detection sensor 43A, drain tube closing 1 detection sensor 43B, first, second and third process inspection sensors 36A, 36B and 36C, respectively, filter emptiness detecting sensor 21C, air pump 5, upper air valve 50, lower air valve 51, beverage supply valve 53, air discharge valve 55, extraction motor 24 and waste processing motor 40 described above, and further main control unit 7 for controlling serving of the beverage.

A serving signal is outputted from main control unit 7 to control unit 6 every time when the extracted beverage is served. Control unit 6 to which the serving signal is inputted from main control unit 7 controls extraction motor 24, waste processing motor 40 and air pump 5 so that a series of processes including agitation process, extraction process and waste disposal process are controlled.

A cleaning command signal is outputted from main control unit 7 to control unit 6 at a predetermined time (when the frequency of serving is small, for example, midnight or dawn). Control unit 6 to which the cleaning command signal is inputted from main control unit 7 controls extraction motor 24, waste processing motor 40 and air pump 5 so that the cleaning of cylinder 20 is controlled.

In more detail, overflow cleaning and agitation cleaning are executed by control unit 6. The overflow cleaning is carried out by supplying mixing chamber 20b having conduit 20e closed with hot water in an amount in excess of the volume of mixing chamber 20b so as to overflow the hot water out of mixing chamber 20b. The agitation cleaning is carried out by introducing hot water into extraction chamber 20d having the lower end of cylinder 20 pressed to beverage receiver 22 so as to contact therewith and agitating the hot water to clean extraction chamber 20d. Thereby, mixing chamber 20b and extraction chamber 20d are cleaned.

Figure 8:
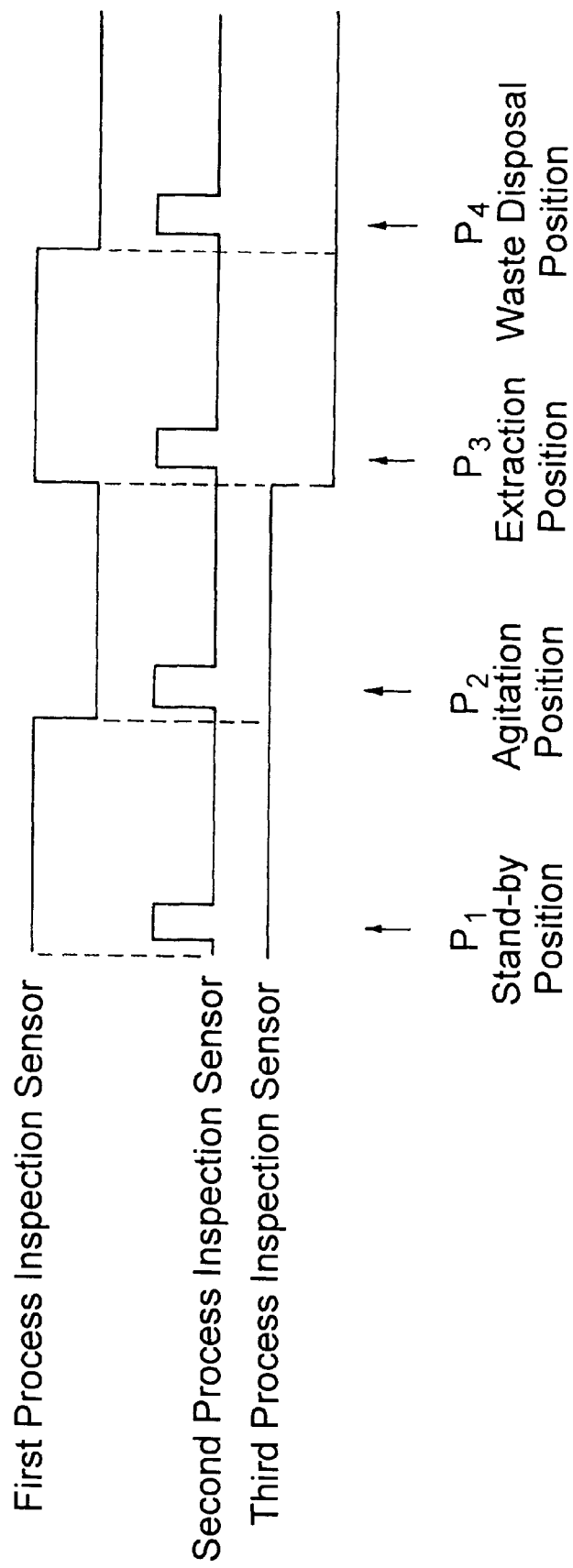
FIG. 8 is an explanatory view of output signals from first, second and third process inspection sensors in the beverage extraction apparatus in the preferred embodiment.
Figure 9B:
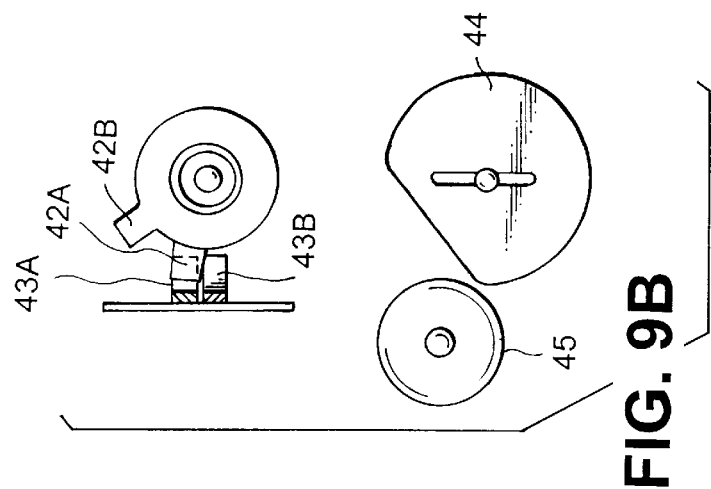
Figure 9A:
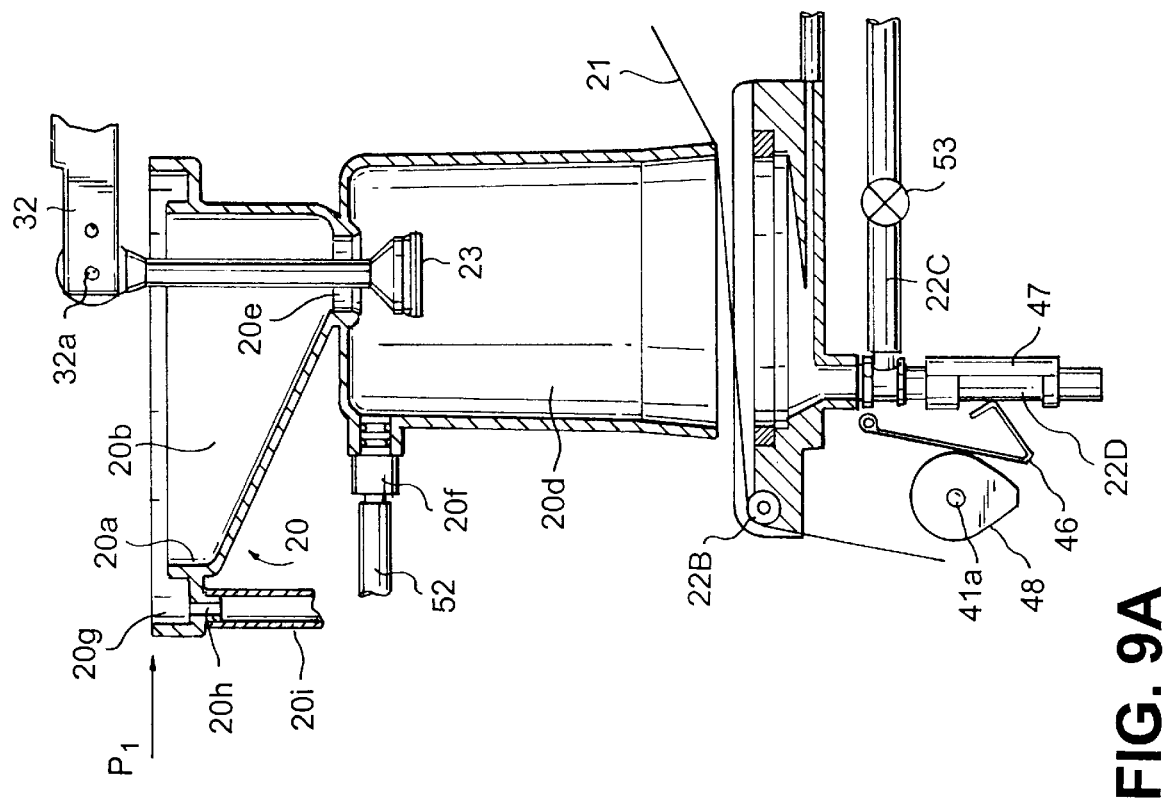

The operation of beverage extraction apparatus 1 will be explained with reference to FIGS. 8 to 15. FIG. 8 indicates the signals outputted from first, second and third process inspection sensors 36A, 36B and 36C, respectively. FIGS. 9A to 15A, FIGS. 9B to 15B and FIGS. 9C to 15C show the operation of beverage extraction apparatus 1. FIGS. 9A to 15A show the positions of main components (cylinder 20, valve 13, etc.) FIGS. 9B to 15B show the positions of drain tube opening detection plate 42A, drain tube closing detection plate 42B and filter supplying roller 44. FIGS. 9C to 15C show the positions of cylinder cam 27A and valve cam 27B. FIGS. 9D to 15D show the positions of first, second and third process inspection plates 35A, 35B and 35C, respectively.

(1) Stand-by State (FIGS. 9A to 9D)

In the stand-by state, main parts of beverage extraction apparatus 1 take the stand-by position $P_1$ shown by FIGS. 9A to 9D. In detail, first, second and third process inspection sensors 36A, 36B and 36C, respectively, are all on, drain tube opening detection sensor 43A is off, while drain tube closing detection sensor 43B is on. Pressure plate 46 is in contact with pressing cam 48 by elastic force of drain tube 22D.

(2) Agitation Process (FIGS. 10A to 10D and FIGS. 11A to 11D)

Figure 10B:
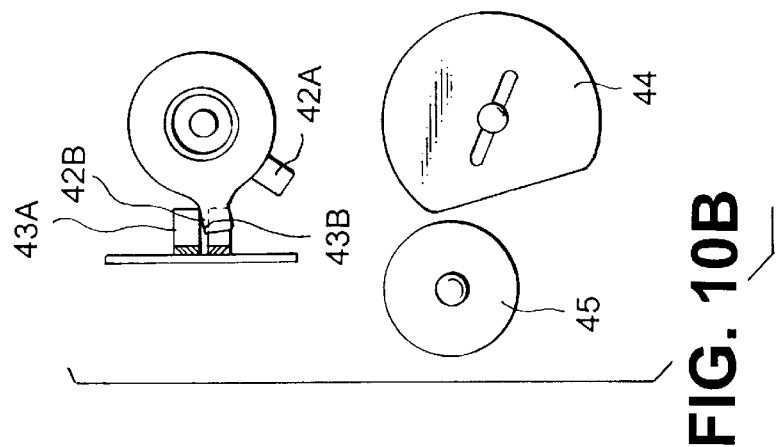
Figure 10A:
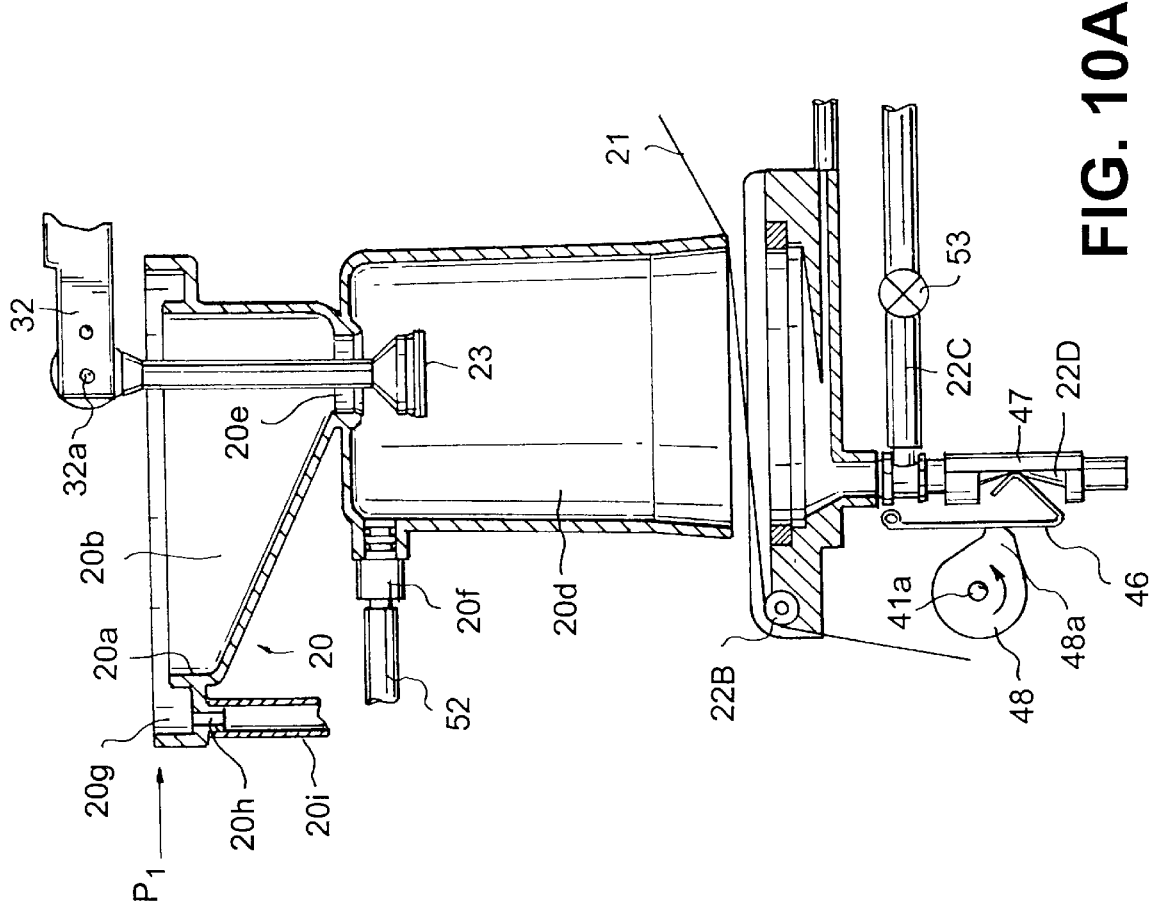

When the serving signal is outputted from main control unit 7, control unit 6 executes the operation of transfer from stand-by position $P_1$ to agitation position $P_2$ in accordance with first and third process inspection sensors, 36A and 36C, being on, as long as second process inspection sensor 36B is on. More detailed description follows. Control unit 6 causes waste processing motor 40 to rotate in the normal direction (output axis 41a rotates anti-clockwise in FIG. 10A). The driving torque of waste processing motor 40 is transmitted through reducing unit 41 to output axis 41a, which is rotated 60 degrees in the normal direction (anti-clockwise in FIG. 10A), whereby protrusion 48a of pressing cam 48 presses pressure plate 46, as shown in FIG. 10A, so that drain tube 22D is pinched between pressure plate 46 and stationary plate 47, to be closed. Drain tube closing detection sensor 43B is shaded by protrusion 42a of drain tube closing detection plate 42B to output an off-signal to control unit 6, which then allows waste processing motor 40 to stop, according to the off-signal.

Then, control unit 6 allows extraction motor 24 to rotate in the normal direction (which causes anticlockwise rotation of output axis 25b in FIG. 11D). The driving torque of extraction motor 24 is transmitted through reducing unit 25 to output axes 25a and 25b to rotate the axes in the normal direction (anticlockwise rotation of output axis 25b in FIG. 11D). Owing to the rotation of output axes 25a and 25b in the normal direction, cylinder cam 27A and valve cam 27B rotate in the normal direction, as shown in FIG. 11C, causing cylinder driving plate 28A and valve driving plate 28B to descend. Descending of cylinder driving plate 28A, on the one hand, allows cylinder 20 to descend by way of connecting members 31A, 31B and 31C, and thus the lower end of extraction chamber 20d presses paper filter 21 to beverage receiver 22, thereby paper filter 21 comes into contact with beverage receiver 22. Descending of valve driving plate 28B, on the other hand, allows valve 23 to descend by way of connecting member 33 and lever 32. First process inspection sensor 36A is shaded by first process inspection plate 35A to output an off-signal to control unit 6. Then, second process inspection sensor 36B outputs an on-signal to control unit 6. On such condition, control unit 6 causes extraction motor 24 to stop according to the off signal from first process inspection plate 35A. The main part of beverage extraction apparatus takes agitation position $P_3$ in FIG. 8 to be in the state shown in FIG. 11, in which second and third process inspection sensors, 36B and 36C, output on-signals to control unit 6 because they are tree from shading by protrusions 35b and 35c of second and third process inspection plates 35B and 35C, respectively.

Control unit 6 executes the agitation process based on the off-signal from first process inspection sensor 36A and the on-signal from third process inspection sensor 36C, as long as second process inspection sensor 36B is outputting an on-signal. More detailed description follows.

A signal requesting powdered raw material and hot water is outputted from control unit 6 to main control unit 7. Based on the control by main control unit 7, the powdered raw material and hot water are supplied to inlet 20a of mixing chamber 20b. At the same time, beverage supply valve 53 is closed, lower air valve 51 is opened and air pump 5 is operated based on the control by control unit 6. Air pump 5 supplies pressurized air to beverage receiver 22 through air pipe 52.

The pressurized air flows into extraction chamber 20d through paper filter 21, whereby the air bubbles agitate the mixture of powdered raw material and hot water in extraction chamber 20d. The supply of pressurized air from the lower surface of paper filter 21 accelerates dissolution of the beverage component into the hot water, thereby beverage extraction is completed in a short period.

(3) Extraction Process (Refer to FIGS. 12A to 12D)

Control unit 6 drives extraction motor 24 to rotate in the normal direction after the period for agitation set by a timer. The driving torque of extraction motor 24 is transmitted through reducing unit 25 to output axes 25a and 25b, whereby cylinder cam 27A and valve cam 27B are rotated in the normal direction. Because the diameter of cylinder cam 27A is constant as shown in FIG. 12C, cylinder 20 does not ascend or descend. Because valve cam 27B is increased in diameter as it is rotated, valve 23 is elevated, as shown in FIG. 12A, to close conduit 20e. Third process inspection sensor 36C is shaded by third process inspection plate 35C to output an off-signal to control unit 6. Then, second process inspection sensor 36B outputs an on-signal to control unit 6. On such condition, control unit 6 causes extraction motor 24 to stop according to the off-signal from third process inspection sensor 36C. The main part of beverage extraction apparatus takes agitation position P3 in FIG. 8, to be in the state shown in FIGS. 12A to 12D, in which first and second process inspection sensors, 36A and 36B, output on-signals. Control unit 6 executes the extraction process based on the on-signal from first process inspection sensor 36A and the off-signal from third process inspection sensor 36C, when second process inspection sensor 36B is outputting an on-signal. More detailed description follows.

Upper air valve 50 is opened, lower air valve 51 and air discharge valve 55 are closed, beverage supply valve 53 is opened and air pump 5 is operated based on the control by control unit 6. Air pump 5 supplies pressurized air through air pipe 52 to extraction chamber 20d, being introduced thereto from inlet 20f.

The mixture in extraction chamber 20d is transported downward by pressurized air from air pump 5 and filtered by paper filter 21. The beverage filtered by paper filter 21 is supplied to a serving cup through beverage receiver 22 and beverage supply tube 22C. The pressurized air supplied to extraction chamber 20d increases the pressure therein so as to press down the mixture toward paper filter 21, whereby the mixture is separated to the beverage and the waste in a short period, the efficiency of extraction being improved.

(4) Waste Disposal Process (Refer to FIGS. 13A to 13D and FIGS. 14A to 14D)

Figure 13B:
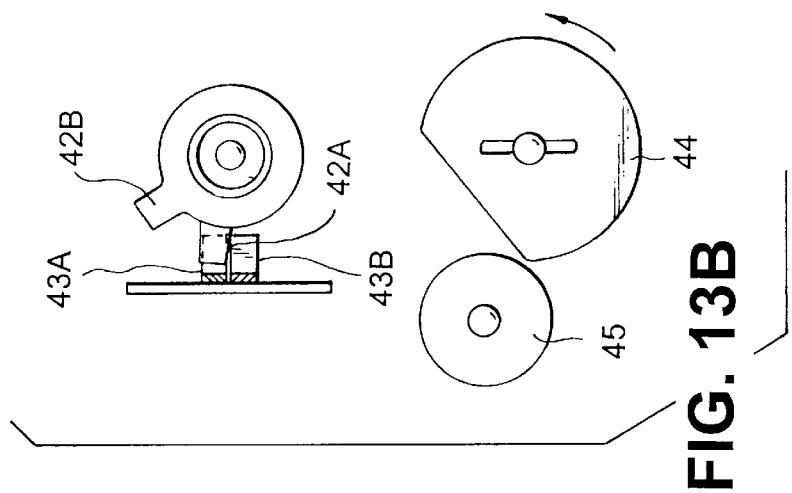
Figure 13A:
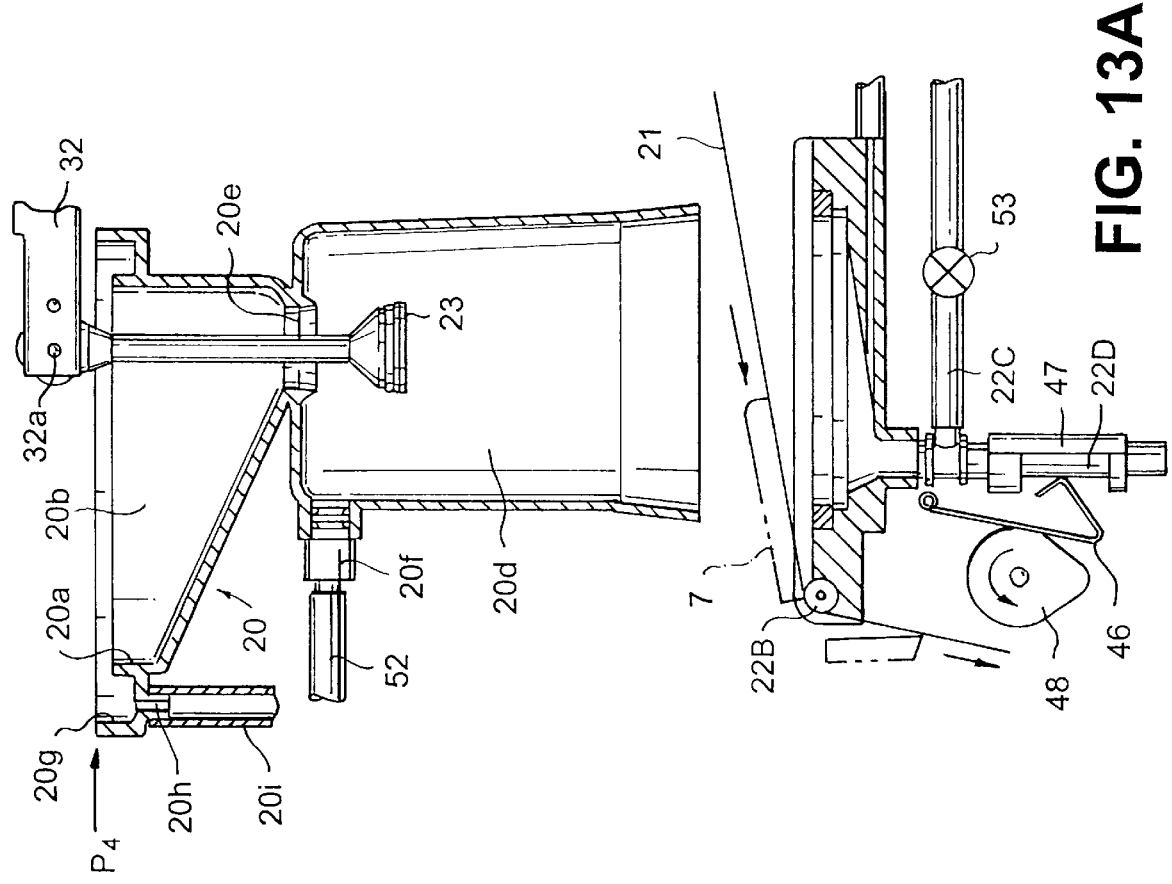
Figure 14C:
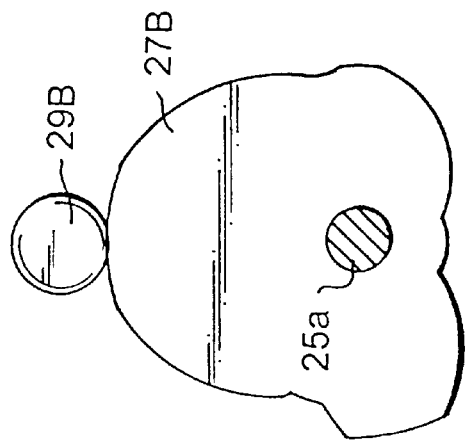
Figure 14C:
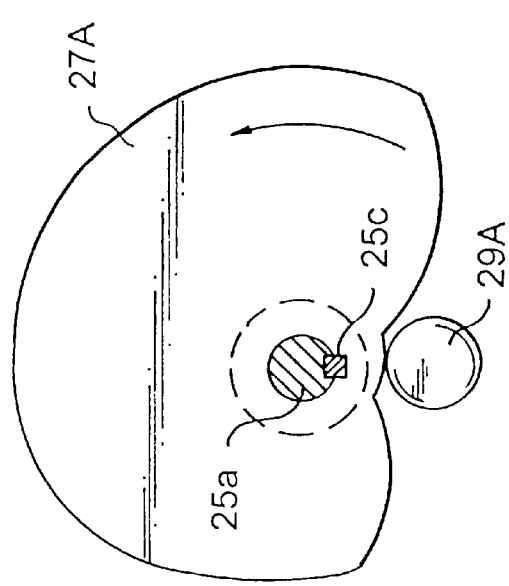
Figure 14D:
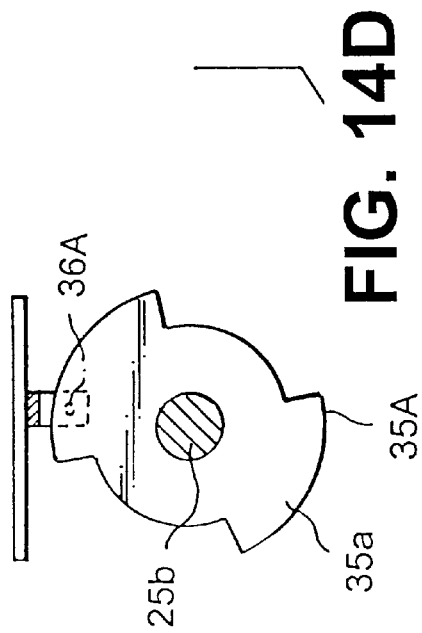
Figure 14D:
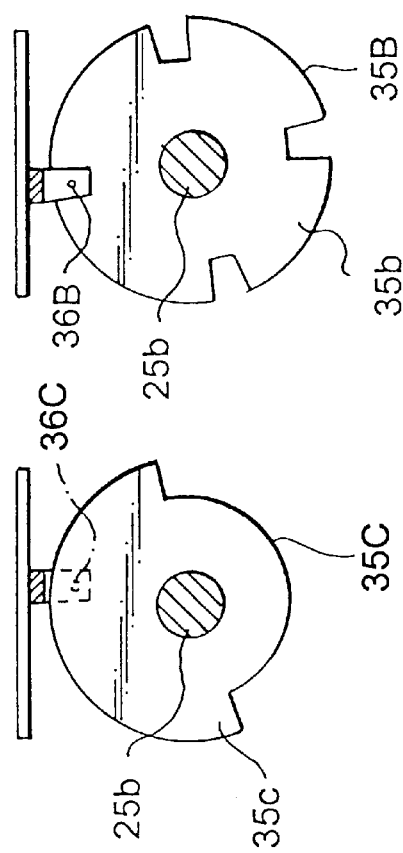
Figure 15:
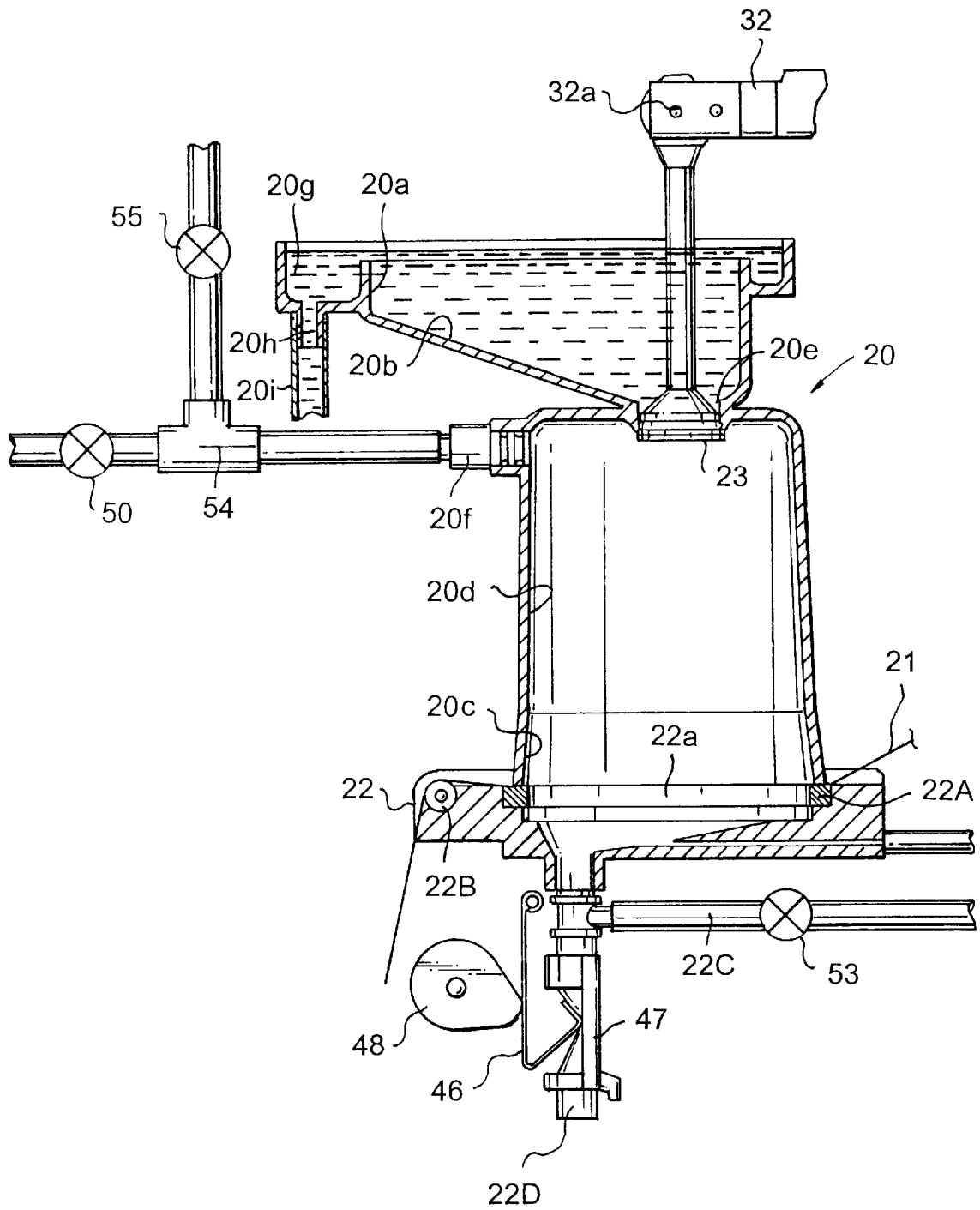
FIG. 15 is an explanatory view of the mixing chamber in the status of cleaning.

After the period for extraction set by the timer is elapsed, control unit 6 allows extraction motor 24 to rotate in the normal direction. The driving torque of extraction motor 24 is transmitted through reducing unit 25 to output axes 25a and 25b to rotate these axes in the normal direction. Owing to the rotation of output axis 25a, cylinder cam 27A and valve cam 27B rotate in the normal direction, as shown in FIG. 13C. Cylinder cam 27A drives cylinder cam follower 29A and valve cam follower 29B to elevate cylinder driving plate 28A and valve driving plate 28B, respectively, thus causing cylinder 20 and valve 23 to ascend to the respective uppermost positions. Owing to the rotation of output axis 25b, first and third process inspection sensors 36A and 36C, respectively, are shaded by first and third process inspection plates 35A and 35C, respectively, as shown in FIG. 13D, to output an off-signal to control unit 6. On the contrary, second process inspection sensor 36B free from shading by second process inspection plate 35B outputs an on-signal to control unit 6. On such a condition, control unit 6 causes extraction motor 24 to stop according to the off signals from first and third process inspection plate 36A and 36C, respectively. The main part of beverage extraction apparatus takes waste disposal position P4 in FIG. 8 to be in the state shown in FIGS. 13A to 13D, in which second process inspection sensor 36B outputs an on-signal to control unit 6.

Control unit 6 executes the waste disposal process based on the off-signals from first process inspection sensor 36A and third process inspection sensor 36C, as long as an on-signal is outputted from second process inspection sensor 36B. More detailed description follows.

Control unit 6 drives waste processing motor 40 in the normal direction. The torque of waste processing motor 40 is transmitted through reducing unit 41 to output axis 41a, whereby filter supply roller 44 is rotated to unwind the roll of paper filter 21. When paper filter 21 having residue 7 thereon passes roller 22B, residue 7 is folded and separated from paper filter 21 and falls into a waste backet (not shown). Drain tube opening sensor 43A is shaded by drain tube opening detection plate 42A so as to output an off-signal to control unit 6, which causes waste disposal motor 40 to stop based on the off-signal from drain tube opening sensor 43A. Then, the main part of beverage extraction apparatus is in the state shown in FIGS. 14A to 14D.

(5) Operation for Returning to Stand-by State.

After the waste disposal process is finished, control unit 6 drives extraction motor 24 and waste processing motor 40 in the normal direction. The main part of beverage extraction apparatus returns to the state shown in FIG. 9. Thereafter, every time when serving signal is inputted in control unit 6, operations (1) to (5) above are repeated.

Meanwhile, when the time predetermined for cleaning comes, a cleaning command signal is outputted from main control unit 7 to control unit 6 which, upon inputting of the cleaning command signal, controls extraction motor 24, waste processing motor 40 and air pump 5, thereby controls the cleaning process in cylinder 20. The cleaning process in cylinder 20 will be explained below.

When the cleaning command signal is received from main control unit 7, control unit 6 executes the operation of transfer from stand-by position P1 to overflow cleaning position (same as extraction position P3) in accordance with first and third process inspection sensors 36A and 36C being on, as long as second process inspection sensor 36B is on. More detailed description follows. Control unit 6 causes waste processing motor 40 to rotate in the normal direction (output axis 41a rotates anti-clockwise in FIG. 6). The driving torque of waste processing motor 40 is transmitted through reducing unit 41 to output axis 41a, which is rotated 60 degrees in normal direction (anticlockwise in FIG. 6) whereby protrusion 48a of pressing cam 48 presses pressure plate 46, as shown in FIG. 12A, so that drain tube 22D is pinched between pressure plate 46 and stationary plate 47, to be closed. Drain tube closing detection sensor 43B is shaded by protrusion 42a of drain tube closing detection plate 42B to output an off-signal to control unit 6, which then allows waste processing motor 40 to stop according to the off-signal from drain tube closing detection sensor 43B.

Then, control unit 6 allows extraction motor 24 to rotate in the normal direction (which causes anticlockwise rotation of output axis 25b in FIG. 11D). The driving torque of extraction motor 24 is transmitted through reducing unit 25 to output axes 25a and 25b to rotate the axes in the normal direction (anticlockwise rotation of output axis 25b in FIG. 11D). Owing to the rotation of output axes 25a and 25b in the normal direction, cylinder cam 27A and valve cam 27B rotate in the normal direction, as shown in FIG. 11C, causing cylinder driving plate 28A and valve driving plate 28B to descend (refer to FIG. 3). Descending of cylinder driving plate 28A, on the one hand, allows cylinder 20 to descend by way of connecting members 31A, 31B and 31C, and thus the lower end of extraction chamber 20d presses paper filter 21 to beverage receiver 22, thereby paper filter 21 comes into contact with beverage receiver 22. Descending of valve driving plate 28B, on the other hand, allows valve 23 to descend by the help of connecting member 33 and lever 32. With the normal rotation of output axes 25a and 25b, valve driving plate 28B is elevated, resulting in elevation of valve 23 and closing of conduit 20e. Third process inspection sensor 36C is shaded by third process inspection plate 35C to output an off-signal to control unit 6. Then, second process inspection sensor 36B outputs an on-signal to control unit 6. On such condition, control unit 6 causes extraction motor 24 to stop according to the off-signal from third process inspection sensor 35C.

Thereafter, control unit 6 outputs a signal requesting hot water to be supplied to main control unit 7. Based on the control by main control unit 7, hot water in an amount exceeding the volume of mixing chamber 20b is supplied to inlet 20a thereof. After mixing chamber 20b is filled with the hot water, excess of hot water overflows out of mixing chamber 20b together with the residue removed from the interior thereof and is discharged from trough 20g around it through drain tube 20i to a waste backet (not shown), thereby the overflow cleaning of mixing chamber 20b is accomplished.

Figure 16:
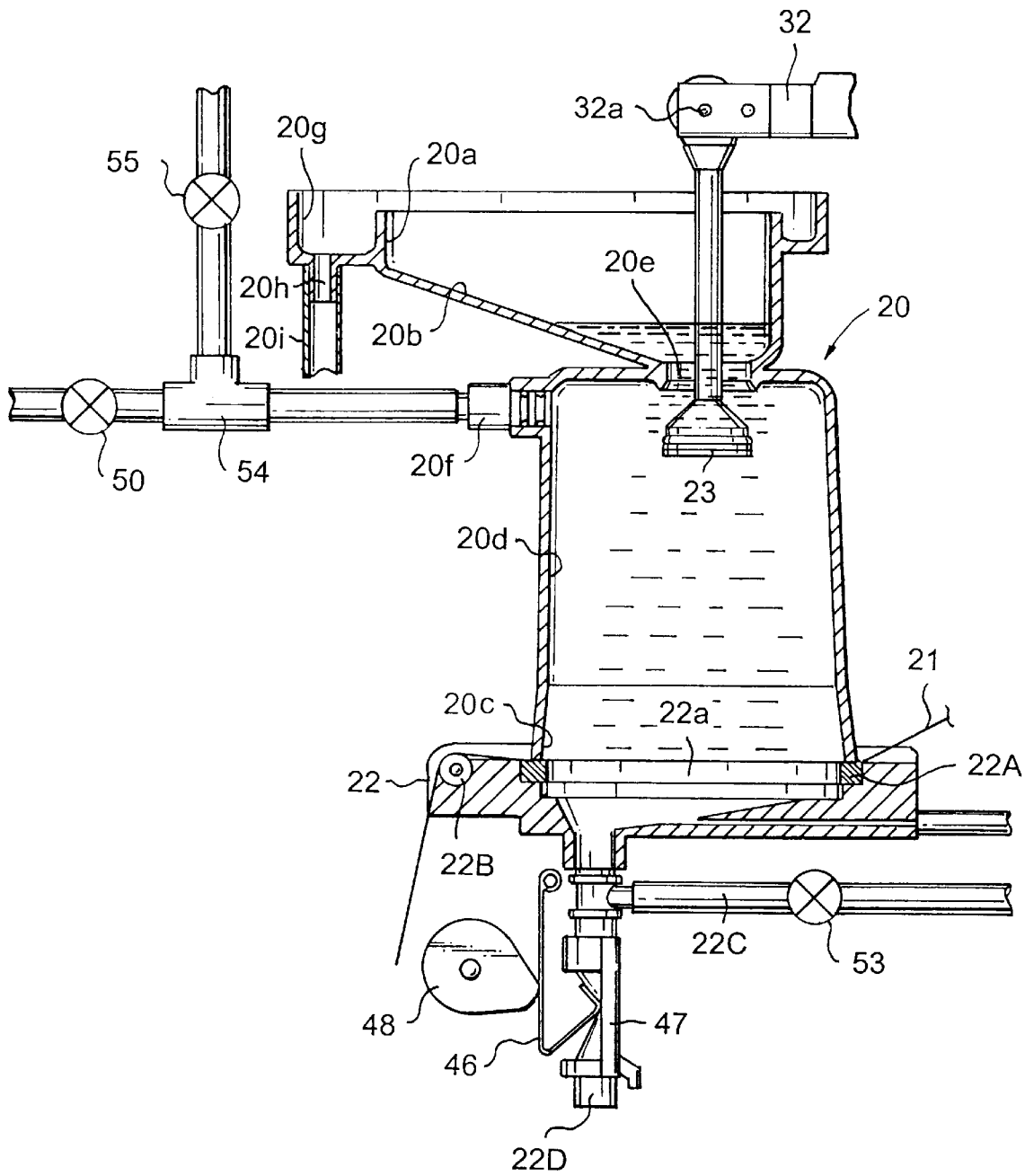
FIG. 16 is an explanatory view of the beverage extraction apparatus in the embodiment in the transient state from the cleaning of mixing chamber to the cleaning of extraction chamber.
Figure 17:
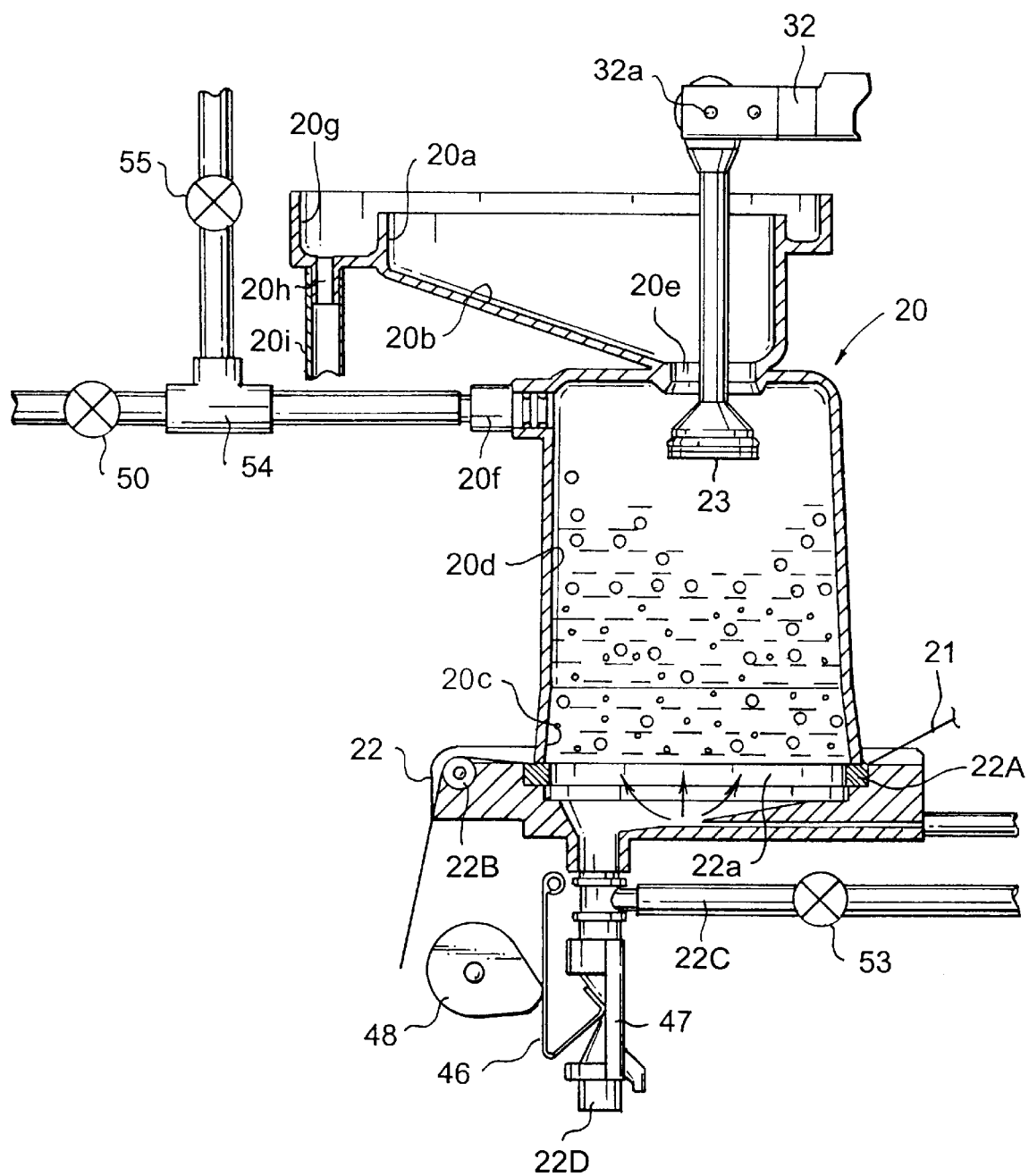
FIG. 17 is an explanatory view of the state of cleaning of the extraction chamber in the beverage extraction apparatus in the embodiment.
Figure 18:
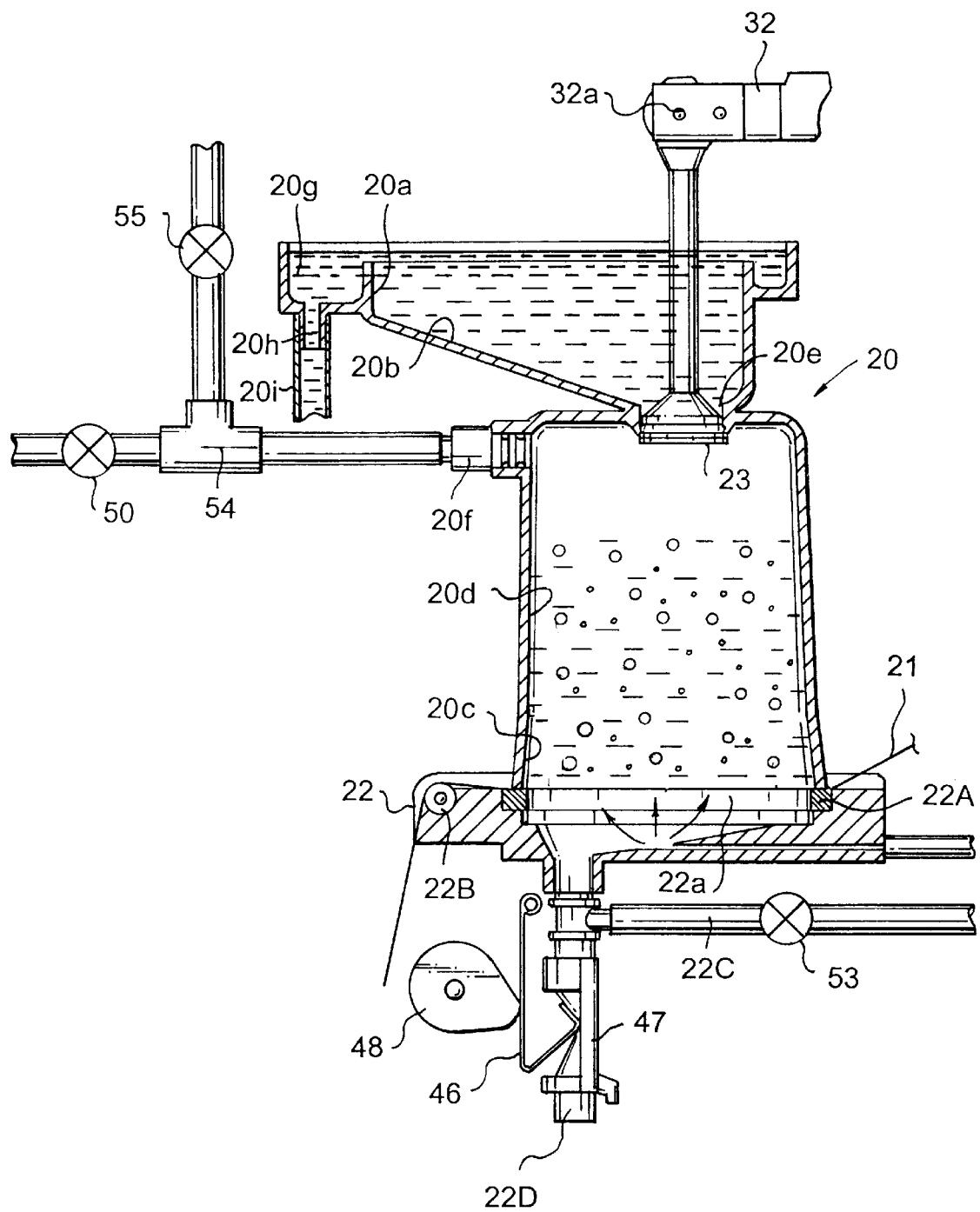
FIG. 18 is an explanatory view of the beverage extraction apparatus in the second preferred embodiment of the invention.

After the overflow cleaning of mixing chamber 20b is completed, control unit 6 operates to change the status of beverage extraction apparatus from overflow cleaning position to agitation cleaning position (same as agitation position $P_2$ in FIG. 8). Air discharge valve 55 is opened, upper air valve 50 and lower air valve 51 are closed and extraction motor 24 is rotated in the reversed direction. The driving torque of extraction motor 24 is transmitted through reducing unit 25 to output axes 25a and 25b to rotate the axes in the reversed direction (clockwise rotation of output axis 25b). Owing to the rotation of output axes 25a and 25b in the reversed direction, cylinder cam 27A and valve cam 27B rotate in the reversed direction, cylinder 20 does not move as the diameter of cylinder cam 27A is fixed. As the diameter of valve cam 27B decreases with its rotation, valve 23 is lowered so as to open conduit 20e. Second process inspection sensor 36B outputs an on-signal to control unit 6. Then, first process inspection sensor 36A is shaded by first process inspection plate 35A to output an off-signal to control unit 6. On such condition, control unit 6 causes extraction motor 24 to stop according to the off-signal from first process inspection sensor 36A. When conduit 20e is thus opened, hot water in mixing chamber 20b is supplied to extraction chamber 20d, as shown in FIG. 16. As air discharge valve 55 is opened, air in exraction chamber is prevented from passing conduit 20e to enter into mixing chamber 20b by the increase in pressure in extraction chamber 20d, whereby mixing chamber 20b cleaned by the overflow cleaning is restrained from recontamination.

Thereafter, control unit 6 operates so as to open lower air valve 51 and actuate air pump 5 in accordance with the supply of hot water to extraction chamber 20. Pressurized air is supplied by air pump 5 to beverage receiver 22 through air pipe 52, and flows into extraction chamber 20d through paper filter 21. When the air asses through the hot water in extraction chamber 20d, the flow of air bubbles agitates the hot water, so that the residue attached to the interior of extraction chamber 20d is removed. Thereafter, a signal requesting the supply of hot water is outputted to main control unit 7, by the control of which a predetermined amount of hot water is supplied to mixing chamber 20b through inlet 20a. Thereby, the residue attached to the interior of extraction chamber 20d above the water level and that to valve 23 are removed.

At last, transfer from extraction chamber cleaning position to the cleaning water disposal position is performed by control unit 6. Control unit 6 drives waste processing motor 40 to rotate in the reversed direction, whereby pressing cam 48 rotates in the reversed direction by about 60 degrees, pressure applied to drain tube 22D by pressure plate 46 is removed so as to open drain tube 22D. Drain tube opening detection sensor 43A is shaded by drain tube opening detection plate 42A so as to output an off-signal to control unit 6, which operates to cause waste processing moter 40 to stop according to drain tube opening detection sensor 43A.

Then, control unit 6 drives waste processing motor 40 to rotate in the normal direction. The driving torque of extraction motor 24 is transmitted through reducing unit 25 to output axes 25a and 25b to rotate the axes in the normal direction. Cylinder 20 does not move, as the diameter of cylinder cam 27A is fixed. As the diameter of valve cam 27B is increased with its rotation, valve 23 is elevated so as to close conduit 20e. Third process inspection sensor 36C is shaded by third process inspection plate 35C to output an off-signal to control unit 6. Then, second process inspection sensor 36B outputs anon-signal to control unit 6. On such condition, control unit 6 causes extraction motor 24 to stop according to the off-signal from third process inspection sensor 36C. Upper air valve 50 is opened and air pump 5 is operated to supply pressurized air to extraction chamber 20d. The pressurized air drives the hot water in extraction chamber 20d downward to pass through paper filter 22, beverage receiver 22 and drain tube 22D to a waste backet. After predetermined time set by a timer is elapsed, air pump is stopped and extraction motor 24 is driven to rotate in the normal direction to move cylinder 20 to waste disposal position $P_4$. At the same time, waste processing motor 40 is driven to rotate in the normal direction, to rotate filter supply roller 44 to unwind the roll of paper filter 21. Thereby, the residue on paper filter 21 which is removed by the cleaning falls into a waste backet.

Though the cleaning of extraction chamber 20d is conducted, in the preferred embodiment described above, by the excess hot water in the overflow cleaning, additional hot water may be supplied from inlet 20a if it is not enough.

In the preferred embodiment described above, mixing chamber 20b is cleaned by overflowing the hot water filling in mixing chamber 20b to trough 20g, and extraction chamber 20d is cleaned by introducing the hot water left in mixing chamber 20b into extraction chamber 20d and agitating the hot water therein. Therefore, the whole of cylinder 20 can be kept clean and the quality of beverage extracted can be maintained without periodical or frequent maintenance for cleaning. Quantity of hot water used for the cleaning as well as the drain can be decreased because the hot water used for mixing chamber is used again for cleaning of extraction chamber 20d.

If it is desired to shorten the period for cleaning rather than to decrease the quantity of hot water, the agitation cleaning of extraction chamber 20d and overflow cleaning of mixing chamber 20b may be carried out simultaneously by introducing hot water into extraction chamber 20d followed by supplying hot water from inlet 20a with conduit 20e closed by means of valve 23. In this occasion, lower air valve 51 and air discharge valve 55 must be opened and upper air valve 50 must be closed so as to release the pressure in extraction chamber 20d to the atmosphere from air discharge valve 55.

As described in the foregoing, both extraction chamber and upper chamber can be cleaned in a beverage extraction apparatus according to the invention because the apparatus is provided with a cleaning liquid discharging means leading the cleaning liquid overflowed out of the upper chamber to waste disposal portion attached to the upper chamber and so arranged that the cleaning liquid is supplied to the upper chamber which is prevented from communication with the extraction chamber by closure of a valve. Consequently, the whole of the cylinder for extraction can be kept clean and, thus, the quality of beverage extracted in the invented apparatus can be maintained without periodical or frequent maintenance for cleaning.

Although the invention has been described with respect to the specific embodiments for complete and clear disclosure, the appended claims are not to be thus limited but are to be construed as embodying all modification and alternative construction that may occur to one skilled in the art which fairly fall within the basic teaching herein set forth.

What is claimed is:

1. A beverage extraction apparatus comprising:

an extraction chamber for beverage extraction;

an upper chamber provided above said extraction chamber in liquid communication therewith;

means for supplying cleaning liquid to said upper chamber;

means for discharging said cleaning liquid out of said upper chamber after cleaning by said cleaning liquid is finished; and means for draining a portion of said cleaning liquid overflowing from said upper chamber while said cleaning liquid is supplied to said upper chamber, said means being provided on said upper chamber.

2. A beverage extraction apparatus as defined in claim 1, wherein:

said draining means comprises:

a trough provided around an upper opening of said upper chamber; and a drain tube connected with said trough for draining said overflowing portion of said cleaning liquid.

3. A beverage extraction apparatus comprising:

an extraction chamber for beverage extraction;

an upper chamber provided above said extraction chamber in liquid communication therewith;

means for providing said liquid communication;

means for supplying cleaning liquid to said upper chamber; and means for draining a portion of said cleaning liquid overflowing from said upper chamber during the cleaning using said cleaning liquid, said draining means being provided on said upper chamber; wherein:

said cleaning liquid supplied to said upper chamber is transfered to said extraction chamber by way of said liquid communication providing means.

4. A beverage extraction apparatus comprising:

an extraction chamber for beverage extraction;

an upper chamber provided above said extraction chamber in liquid communication therewith;

means for providing said liquid communication;

means for supplying cleaning liquid to said upper chamber; and means for draining a portion of said cleaning liquid overflowing from said upper chamber while said cleaning liquid is supplied to said upper chamber, said draining means being provided on said upper chamber; wherein:

said liquid communication providing means is opened or closed; and said cleaning liquid is contained in said upper chamber with said liquid communication providing means being closed.

5. A beverage extraction apparatus as defined in claim 4, wherein:

said cleaning liquid is supplied from said upper chamber to said extraction chamber with said liquid communication providing means being opened.

6. A beverage extraction apparatus as defined in claim 4, wherein:

said cleaning liquid is supplied to said upper chamber with said liquid communication providing means being closed, after said cleaning liquid has been supplied to said upper chamber for cleaning thereof, with said liquid communication providing means being opened.

7. A beverage extraction apparatus as defined in claim 4, wherein:

said liquid communication providing means comprises a valve which is opened and closed.

* * * * *

UNITED STATES PATENT AND TRADEMARK OFFICE
CERTIFICATE OF CORRECTION

PATENT NO.   : 5,992,300
DATED         : November 30, 1999
INVENTOR(S) : N. Fukishima It is certified that error appears in the above-identified patent and that said Letters Patent is hereby corrected as shown below:

<u>Column 4,</u>
Line 4, "Fig 1" should read -- Fig. 3 --

<u>Column 6,</u>
Line 34, "Fig 1" should read -- Fig 3 --
Line 34, "A-A" should read -- 4-4 --

Signed and Sealed this

Second Day of July, 2002

*Attest:*

*Attesting Officer*

JAMES E. ROGAN
*Director of the United States Patent and Trademark Office*